US010967794B2

United States Patent
Iwashita

(10) Patent No.: US 10,967,794 B2
(45) Date of Patent: Apr. 6, 2021

(54) ZOOM LENS SYSTEM, IMAGING DEVICE HAVING ZOOM LENS SYSTEM, AND VEHICLE HAVING IMAGING DEVICE

(71) Applicant: Panasonic Intellectual Property Management Co., Ltd., Osaka (JP)

(72) Inventor: Tsutomu Iwashita, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 361 days.

(21) Appl. No.: 16/043,075

(22) Filed: Jul. 23, 2018

(65) Prior Publication Data
US 2018/0326909 A1 Nov. 15, 2018

Related U.S. Application Data

(63) Continuation of application No. PCT/JP2016/005017, filed on Nov. 30, 2016.

(30) Foreign Application Priority Data

Feb. 24, 2016 (JP) .............................. JP2016-032649

(51) Int. Cl.
*G02B 15/14* (2006.01)
*B60R 1/02* (2006.01)
(Continued)

(52) U.S. Cl.
CPC .............. *B60R 1/02* (2013.01); *G02B 13/006* (2013.01); *G02B 13/009* (2013.01); *G02B 13/18* (2013.01);
(Continued)

(58) Field of Classification Search
CPC .... G02B 15/177; G02B 13/18; G02B 13/009; G02B 5/005; G02B 13/04; G02B 15/142;
(Continued)

(56) References Cited

U.S. PATENT DOCUMENTS 5,877,901 A * 3/1999 Enomoto ............... G02B 13/06
359/681
7,280,284 B2 * 10/2007 Ishii ....................... G02B 13/06
359/680
(Continued)

FOREIGN PATENT DOCUMENTS

JP S48-20536 U 3/1973
JP S56-150716 A 11/1981
(Continued)

OTHER PUBLICATIONS

Extended European Search Report dated Jan. 30, 2019 for the corresponding European patent application No. 16891369.7.
(Continued)

*Primary Examiner* — Evelyn A Lester
(74) *Attorney, Agent, or Firm* — McDermott Will and Emery LLP

(57) ABSTRACT

A zoom lens system includes, in order from the object side to the image side, a first lens group having negative power and a second lens group having positive power. The first lens group includes at least two negative lenses. When zooming, one of the first lens group and the second lens group is fixed relative to the imaging surface, and the other moves along an optical axis to change an angle of view.

15 Claims, 15 Drawing Sheets

(51) Int. Cl.
*G02B 15/15* (2006.01)
*G02B 15/177* (2006.01)
*G02B 13/18* (2006.01)
*G02B 13/00* (2006.01)
*G02B 15/22* (2006.01)
*G02B 5/00* (2006.01)
*G02B 13/06* (2006.01)
*G02B 13/04* (2006.01)

(52) U.S. Cl.
CPC . *G02B 15/1425* (2019.08); *G02B 15/143503* (2019.08); *G02B 15/143507* (2019.08); *G02B 15/15* (2013.01); *G02B 15/177* (2013.01); *G02B 15/22* (2013.01); *G02B 5/005* (2013.01); *G02B 13/04* (2013.01); *G02B 13/06* (2013.01); *G02B 15/142* (2019.08)

(58) Field of Classification Search
CPC ...... G02B 13/06; G02B 15/15; G02B 13/006; G02B 15/22; G02B 15/143507; G02B 15/1425; G02B 15/143503; B60R 1/02
USPC ........ 359/680, 682–685, 691, 725, 740, 793
See application file for complete search history.

(56) References Cited

U.S. PATENT DOCUMENTS

| | | | |
|---|---|---|---|
| 8,045,275 B2 * | 10/2011 | Park | H04N 5/23296 359/680 |
| 2004/0156119 A1 | 8/2004 | Shibayama | |
| 2007/0047096 A1 | 3/2007 | Ito et al. | |
| 2007/0070523 A1 | 3/2007 | Noda | |
| 2010/0195214 A1 | 8/2010 | Muratani | |
| 2012/0147480 A1 * | 6/2012 | Fujisaki | G02B 15/177 359/691 |
| 2014/0015999 A1 | 1/2014 | Miyano | |
| 2014/0153116 A1 | 6/2014 | Kubota et al. | |
| 2015/0103412 A1 | 4/2015 | Ori | |
| 2015/0177488 A1 | 6/2015 | Kubota et al. | |
| 2017/0102519 A1 | 4/2017 | Kubota et al. | |
| 2018/0003944 A1 | 1/2018 | Fujii | |
| 2018/0017779 A1 | 1/2018 | Nasu et al. | |
| 2019/0053695 A1 | 2/2019 | Fujii et al. | |

FOREIGN PATENT DOCUMENTS

| | | |
|---|---|---|
| JP | S62-206515 A | 9/1987 |
| JP | S62-206517 A | 9/1987 |
| JP | S63-098616 A | 4/1988 |
| JP | S64-44908 A | 2/1989 |
| JP | H06-201993 A | 7/1994 |
| JP | 2000-330019 A | 11/2000 |
| JP | 2002-014282 A | 1/2002 |
| JP | 2007-093961 A | 4/2007 |
| JP | 2010-152207 A | 7/2010 |
| JP | 2010-181518 A | 8/2010 |
| JP | 2012-047909 A | 3/2012 |
| JP | 2012-123412 A | 6/2012 |
| JP | 2014-106521 A | 6/2014 |
| JP | 2014-137483 A | 7/2014 |
| JP | 2015-176174 A | 10/2015 |
| WO | 2012/127826 A1 | 9/2012 |
| WO | 2013/015082 A1 | 1/2013 |
| WO | 2013/175722 A1 | 11/2013 |
| WO | 2017/043352 A1 | 3/2017 |
| WO | 2017/145264 A1 | 8/2017 |
| WO | 2017/145265 A1 | 8/2017 |
| WO | 2017/146021 A1 | 8/2017 |

OTHER PUBLICATIONS

International Search Report of International Application No. PCT/JP2016/005017 dated Feb. 14, 2017 (with English translation).

* cited by examiner (a)

CHF-A2

(b)

(a)

(b)

(a)

CHF-A2

(b)

(a)

F 4.006

-0.10 0.0 0.10
SA (mm)

w = 110.00

-0.10 0.0 0.10
AST (mm)
———— s
-------- m w = 110.00

-40.0 0.0 40.0
DIS (%)
CHF-A2

(b)

F 6.041

-0.10 0.0 0.10
SA (mm)

w = 52.70

-0.10 0.0 0.10
AST (mm)
———— s
-------- m w = 52.70

-10.0 0.0 10.0
DIS (%)

(a)

(b)

(a)

(b)

ZOOM LENS SYSTEM, IMAGING DEVICE HAVING ZOOM LENS SYSTEM, AND VEHICLE HAVING IMAGING DEVICE

CROSS REFERENCE TO RELATED APPLICATIONS

This application is a U.S. continuation application of PCT International Patent Application Number PCT/JP2016/005017 filed on Nov. 30, 2016, claiming the benefit of priority of Japanese Patent Application Number 2016-032649 filed on Feb. 24, 2016, the entire contents of which are hereby incorporated by reference.

BACKGROUND

1. Technical Field

The present disclosure relates to a zoom lens system, an imaging device having a zoom lens system, and a vehicle having an imaging device.

2. Description of the Related Art

Japanese Unexamined Patent Application Publication No. 2007-93961 discloses a two-focus switchable imaging lens including, in order from the object side to the image side, a first lens group having negative power, a second lens group having positive power, and a third lens group having positive power. The two-focus switchable imaging lens achieves magnification via movement along the optical axis of the second lens group.

However, in recent years, demand for lens systems used in, for example, in-car cameras and security cameras to have wider angles of view has increased sharply.

SUMMARY

The present disclosure provides a zoom lens system that beneficially corrects various types of aberrations.

A zoom lens system according to the present disclosure includes, in order from the object side to the image side: a first lens group having negative power; and a second lens group having positive power. The first lens group includes at least two negative lenses. When zooming, one of the first lens group and the second lens group is fixed relative to an imaging surface, and the other of the first lens group and the second lens group moves along an optical axis to change an angle of view.

According to the present disclosure, it is possible to provide a zoom lens system which can beneficially correct various types of aberrations, an imaging device including such a zoom lens system, and a vehicle including such an imaging device.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DETAILED DESCRIPTION OF THE EMBODIMENTS

Hereinafter, embodiments will be described in detail with reference to the accompanying drawings. However, unnecessarily detailed descriptions may be omitted. For example, detailed descriptions of well-known matters or descriptions of components that are substantially the same as components described previous thereto may be omitted. This is to avoid unnecessary redundancy and provide easy-to-read descriptions for those skilled in the art Note that the accompanying drawings and the following description are provided in order to facilitate sufficient understanding of the present disclosure by those skilled in the art, and are not intended to limit the scope of the claims.

In the present disclosure, a lens group includes at least one lens. The power, composite focal length, etc., per lens group are determined according to the types, number, arrangement, etc., of lenses in the lens group.

Embodiments 1 Through 6

FIG. 1, FIG. 3, FIG. 5, FIG. 7, FIG. 9, and FIG. 11 illustrate the lens arrangements of the lens systems according to Embodiments 1 through 6, respectively. Each illustrates a zoom lens system in the infinity focusing state.

In each of these drawings, (a) illustrates the lens configuration when at the wide angle extremity (i.e., in the shortest focal length state; focal length fW), and (b) illustrates the lens configuration when at the telephoto extremity (i.e., in the longest focal length state; focal length fT). Moreover, in each of these drawings, the arrows drawn between (a) and (b) are the straight lines obtained by connecting lens group positions in the wide angle extremity state and telephoto extremity state, sequentially from top to bottom. The wide angle extremity and the telephoto extremity are connected by a simple straight line; actual movement of each lens group may vary.

Note that the asterisks labeled on certain surfaces indicate that those surfaces are aspheric surfaces. Moreover, in each of these drawings, the (+) and (−) signs next to the lens groups correspond to signs indicating the power of the lens group. Moreover, in each of these drawings, the straight line farthest to the right indicates the position of the imaging surface (object-side surface of the imaging element) S.

Embodiment 1

Figure 1:
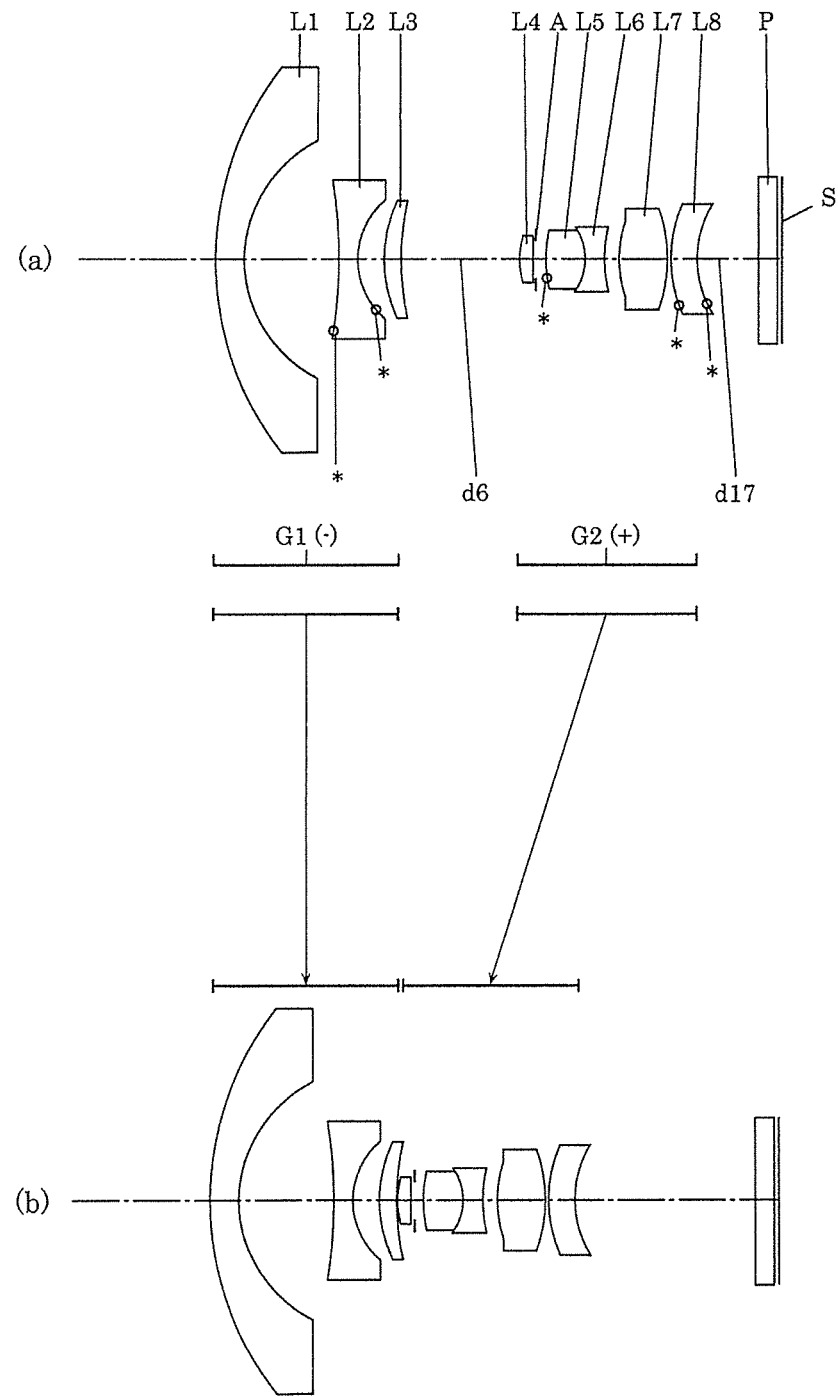
FIG. 1 illustrates the lens arrangement of a zoom lens system according to Embodiment 1 (Value Implementation Example 1)
Figure 2:
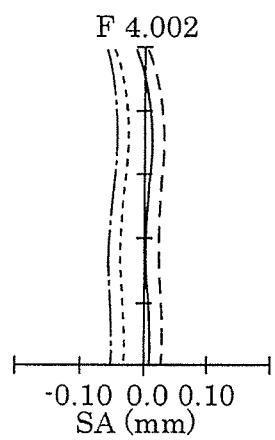
FIG. 2 illustrates longitudinal aberration when in the infinity focusing state according to Value Implementation Example 1.
Figure 2:
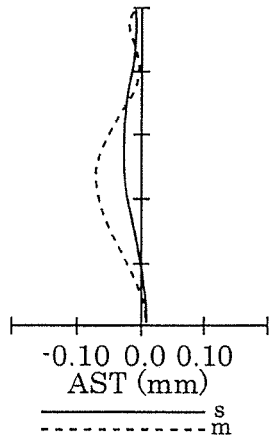
Figure 2:
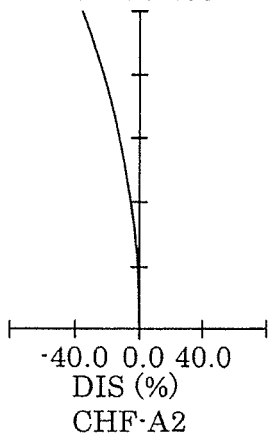
Figure 2:
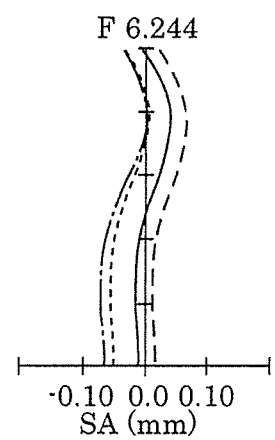
Figure 2:
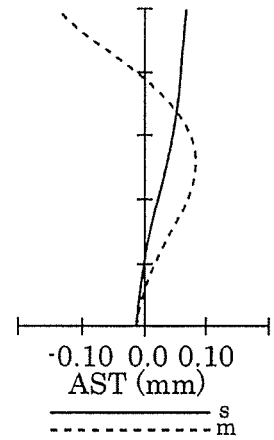
Figure 2:
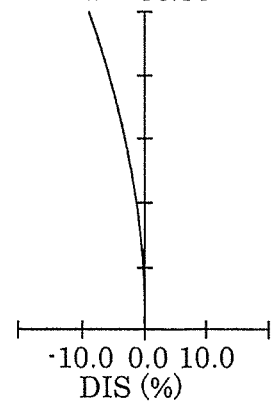

FIG. 1 illustrates a zoom lens system according to Embodiment 1.

The zoom lens system includes, in order from the object side to the image side, first lens group G1 having negative power, second lens group G2 having positive power, and parallel plate P.

First lens group G1 includes, in order from the object side to the image side, first lens L1 having negative power, second lens L2 having negative power, and third lens L3 having positive power.

Second lens group G2 includes, in order from the object side to the image side, fourth lens L4 having positive power, aperture A, fifth lens L5 having positive power, sixth lens L6 having negative power, seventh lens L7 having positive power, and eighth lens L8 having positive power. Fifth lens L5 and sixth lens L6 are bonded together with an adhesive, for example, so as to constitute a cemented lens.

Next, each lens will be described.

First, the lenses in first lens group G1 will be described. First lens L1 is a meniscus lens whose convex surface is on the object side. Second lens L2 is a biconcave lens. The concave surfaces on the object and imaging surface sides of second lens L2 are aspheric. Third lens L3 is a meniscus lens whose convex surface is on the object side.

Next, the lenses in second lens group G2 will be described. Fourth lens L4 is a biconvex lens. Fifth lens L5 is a biconvex lens. The convex surfaces on the object and imaging surface sides of fifth lens L5 are aspheric. Sixth lens L6 is a biconcave lens. Seventh lens L7 is a biconvex concave lens. Eighth lens L8 is a meniscus lens whose convex surface is on the object side. The convex surface on the object side and the concave surface on the image side of eighth lens L8 are aspheric.

In the zoom lens system, when zooming from the wide angle extremity to the telephoto extremity when imaging, second lens group G2 moves to the object side, and first lens group G1 and imaging surface S do not move. In other words, when zooming, second lens group G2 moves along the optical axis such that the distance between first lens group G1 and second lens group G2 decreases and the distance between second lens group G2 and imaging surface S increases.

Embodiment 2

Figure 3:
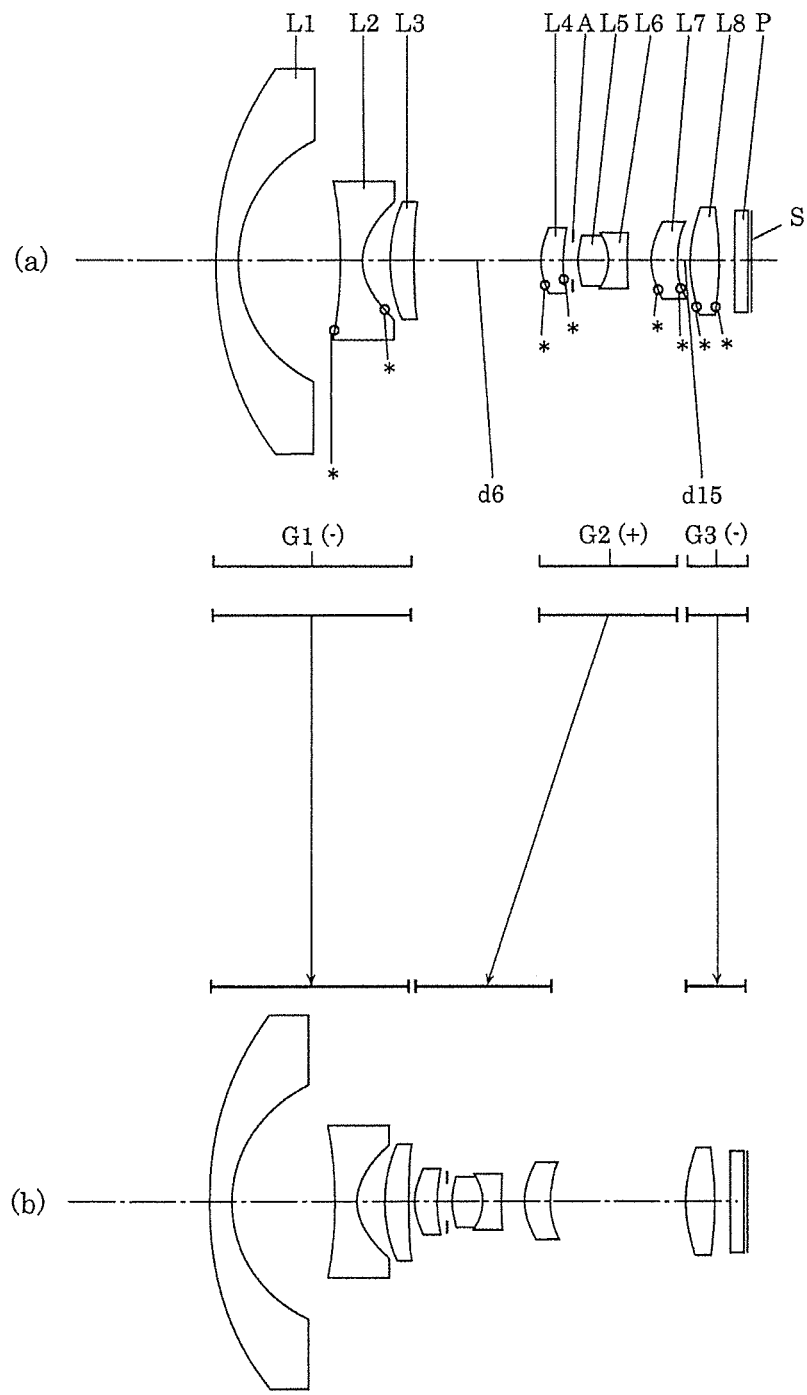
FIG. 3 illustrates the lens arrangement of a zoom lens system according to Embodiment 2 (Value Implementation Example 2)
Figure 4:
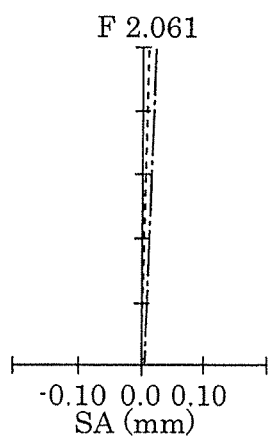
FIG. 4 illustrates longitudinal aberration when in the infinity focusing state according to Value Implementation Example 2.
Figure 4:
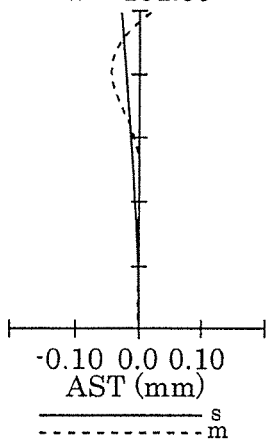
Figure 4:
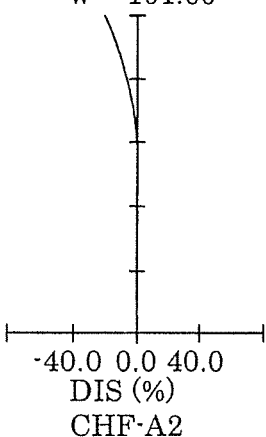
Figure 4:
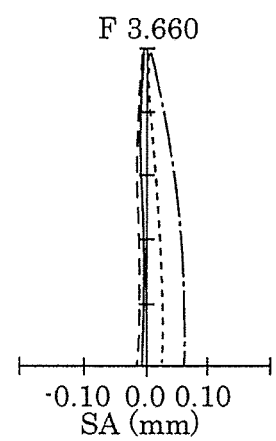
Figure 4:
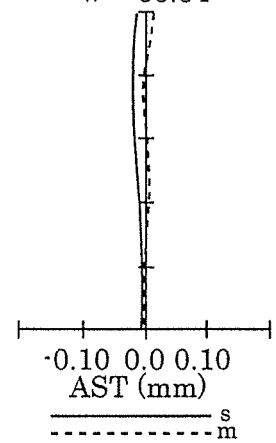
Figure 4:
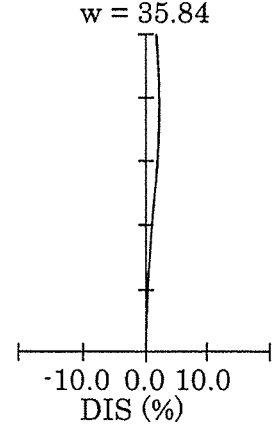

FIG. 3 illustrates a zoom lens system according to Embodiment 2.

The zoom lens system includes, in order from the object side to the image side, first lens group G1 having negative power, second lens group G2 having positive power, third lens group G3 having positive power, and parallel plate P.

First lens group G1 includes, in order from the object side to the image side, first lens L1 having negative power, second lens L2 having negative power, and third lens L3 having positive power.

Second lens group G2 includes, in order from the object side to the image side, fourth lens L4 having positive power, aperture A, fifth lens L5 having positive power, sixth lens L6 having negative power, and seventh lens L7 having positive power.

Fifth lens L5 and sixth lens L6 are bonded together with an adhesive, for example, so as to constitute a cemented lens.

Third lens group G3 includes eighth lens L8 having positive power.

Next, each lens will be described.

First, the lenses in first lens group G1 will be described. First lens L1 is a meniscus lens whose convex surface is on the object side. Second lens L2 is a biconcave lens. The concave surfaces on the object and imaging surface sides of second lens L2 are aspheric. Third lens L3 is a meniscus lens whose convex surface is on the object side.

Next, the lenses in second lens group G2 will be described. Fourth lens L4 is a meniscus lens whose convex surface is on the object side. The convex surface on the object side and the concave surface on the image side of fourth lens L4 are aspheric. Fifth lens L5 is a biconvex concave lens. Sixth lens L6 is a biconcave lens. Seventh lens L7 is a meniscus lens whose convex surface is on the object side. The convex surface on the object side and the concave surface on the image side of seventh lens L7 are aspheric.

Next, the lenses in third lens group G3 will be described. Eighth lens L8 is a biconvex concave lens. The convex surfaces on the object and image sides of eighth lens L8 are aspheric.

In the zoom lens system, when zooming from the wide angle extremity to the telephoto extremity when imaging, second lens group G2 moves to the object side, and first lens group G1, third lens group G3, and imaging surface S do not move. In other words, when zooming, second lens group G2 moves along the optical axis such that the distance between first lens group G1 and second lens group G2 decreases and the distance between second lens group G2 and third lens group G3 increases.

Embodiment 3

Figure 5:
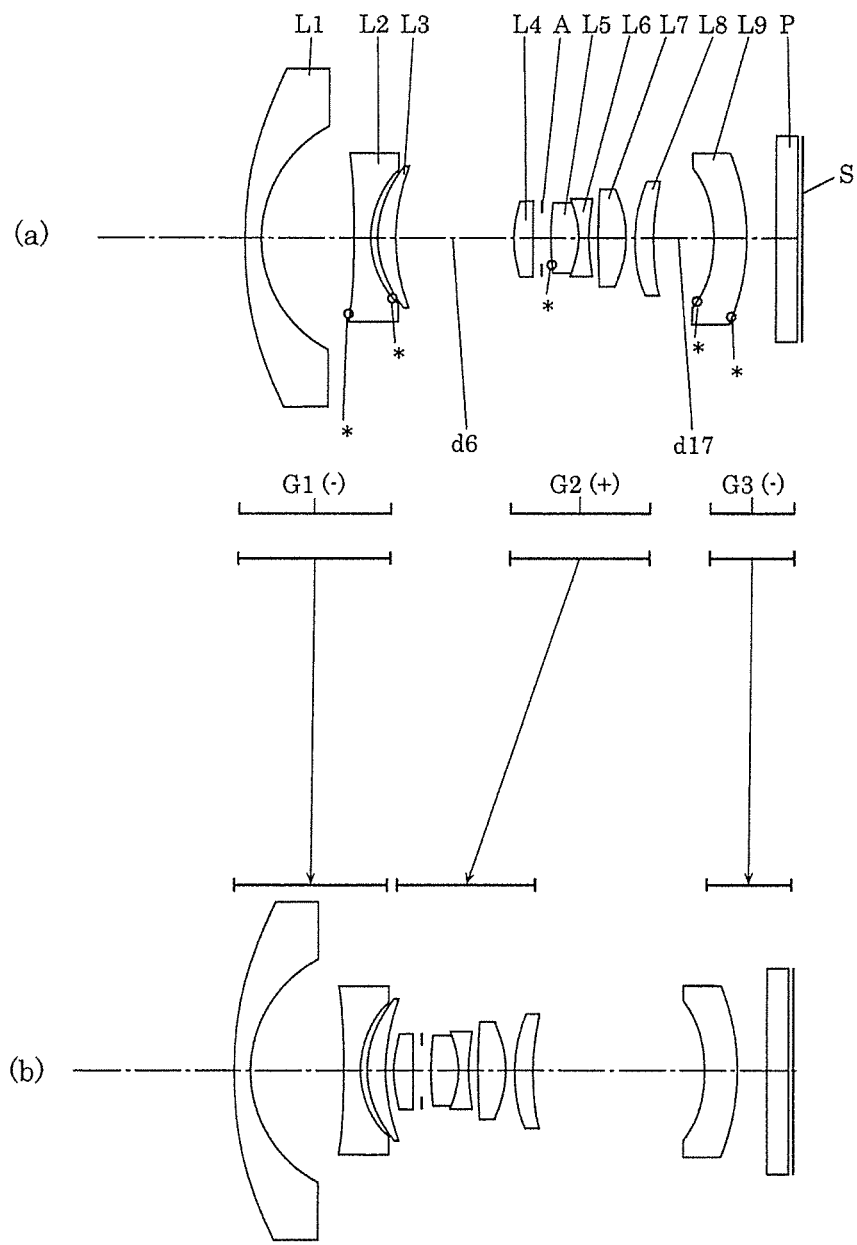
FIG. 5 illustrates the lens arrangement of a zoom lens system according to Embodiment 3 (Value Implementation Example 3)
Figure 6:
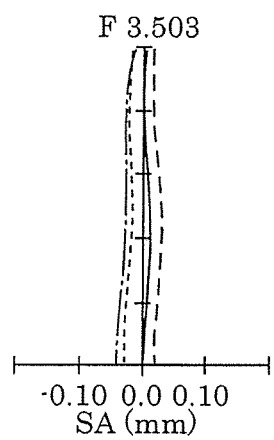
FIG. 6 illustrates longitudinal aberration when in the infinity focusing state according to Value Implementation Example 3.
Figure 6:
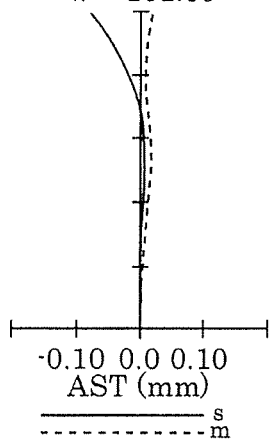
Figure 6:
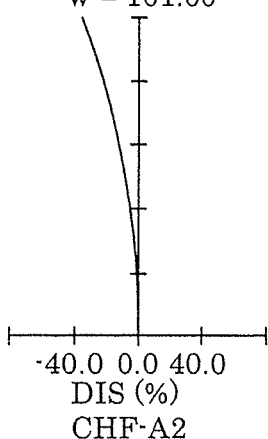
Figure 6:
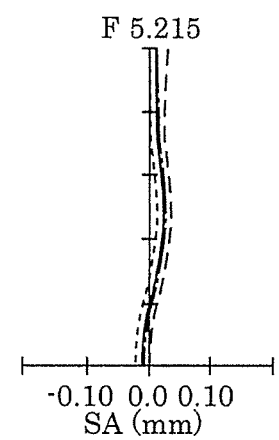
Figure 6:
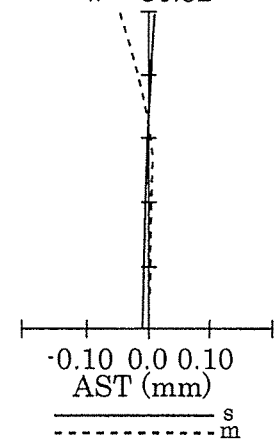
Figure 6:
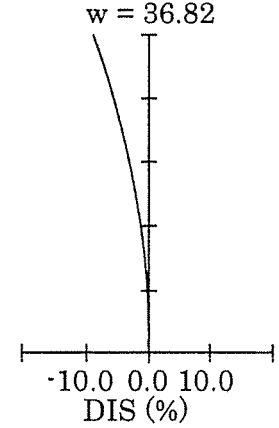

FIG. 5 illustrates a zoom lens system according to Embodiment 3.

The zoom lens system includes, in order from the object side to the image side, first lens group G1 having negative power, second lens group G2 having positive power, third lens group G3 having negative power, and parallel plate P.

First lens group G1 includes, in order from the object side to the image side, first lens L1 having negative power, second lens L2 having negative power, and third lens L3 having positive power.

Second lens group G2 includes, in order from the object side to the image side, fourth lens L4 having positive power, aperture A, fifth lens L5 having positive power, sixth lens L6 having negative power, seventh lens L7 having positive power, and eighth lens L8 having positive power. Fifth lens L5 and sixth lens L6 are bonded together with an adhesive, for example, so as to constitute a cemented lens.

Third lens group G3 includes ninth lens L9 having negative power.

Next, each lens will be described.

First, the lenses in first lens group G1 will be described. First lens L1 is a meniscus lens whose convex surface is on the object side. Second lens L2 is a biconcave lens. The concave surfaces on the object and imaging surface sides of second lens L2 are aspheric. Third lens L3 is a meniscus lens whose convex surface is on the object side.

Next, the lenses in second lens group G2 will be described. Fourth lens L4 is a meniscus lens whose convex surface is on the object side. Fifth lens L5 is a biconvex concave lens. The convex surfaces on the object and imaging surface sides of fifth lens L5 are aspheric. Sixth lens L6 is a biconcave lens. Seventh lens L7 is a biconvex concave lens. Eighth lens L8 is a meniscus lens whose convex surface is on the object side.

Next, the lenses in third lens group G3 will be described. Ninth lens L9 is a meniscus lens whose concave surface is on the object side. The concave surface on the object side and the convex surface on the image side of ninth lens L9 are aspheric.

In the zoom lens system, when zooming from the wide angle extremity to the telephoto extremity when imaging, second lens group G2 moves to the object side, and first lens group G1, third lens group G3, and imaging surface S do not move. In other words, when zooming, second lens group G2 moves along the optical axis such that the distance between first lens group G1 and second lens group G2 decreases and the distance between second lens group G2 and third lens group G3 increases.

Embodiment 4

Figure 7:
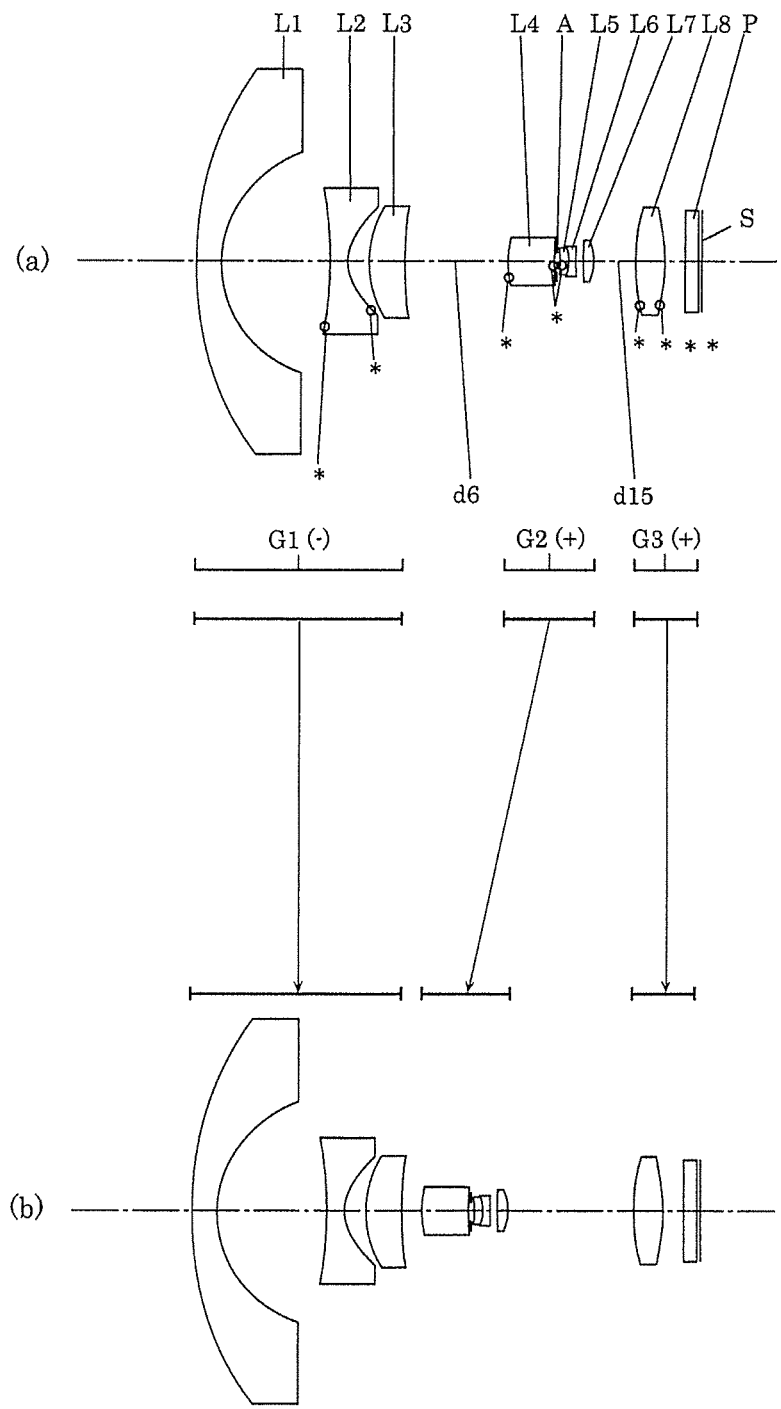
FIG. 7 illustrates the lens arrangement of a zoom lens system according to Embodiment 4 (Value Implementation Example 4)
Figure 8:
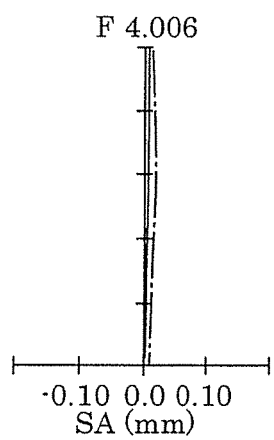
FIG. 8 illustrates longitudinal aberration when in the infinity focusing state according to Value Implementation Example 4.
Figure 8:
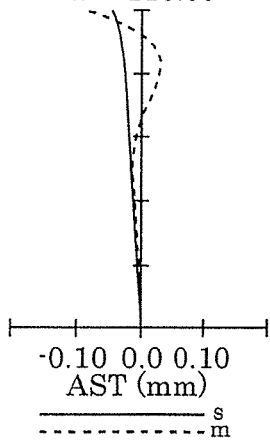
Figure 8:
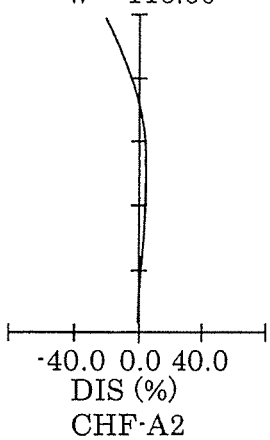
Figure 8:
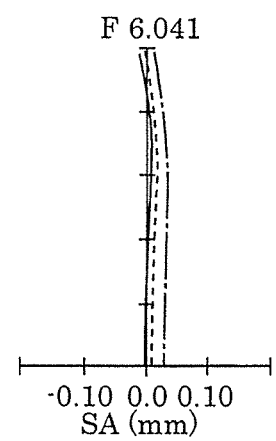
Figure 8:
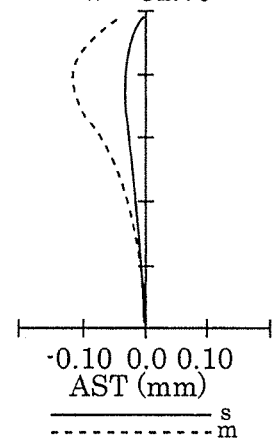
Figure 8:
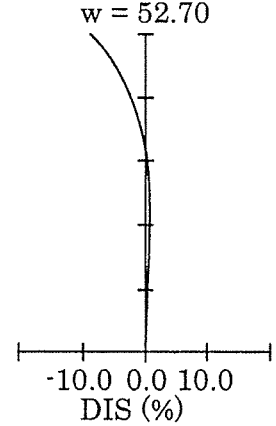

FIG. 7 illustrates a zoom lens system according to Embodiment 4.

The zoom lens system includes, in order from the object side to the image side, first lens group G1 having negative power, second lens group G2 having positive power, third lens group G3 having positive power, and parallel plate P.

First lens group G1 includes, in order from the object side to the image side, first lens L1 having negative power, second lens L2 having negative power, and third lens L3 having positive power.

Second lens group G2 includes, in order from the object side to the image side, fourth lens L4 having positive power, aperture A, fifth lens L5 having positive power, sixth lens L6 having negative power, and seventh lens L7 having positive power. Fifth lens L5 and sixth lens L6 are bonded together with an adhesive, for example, so as to constitute a cemented lens.

Third lens group G3 includes eighth lens L8 having positive power.

Next, each lens will be described.

First, the lenses in first lens group G1 will be described. First lens L1 is a meniscus lens whose convex surface is on the object side. Second lens L2 is a biconcave lens. The concave surfaces on the object and imaging surface sides of second lens L2 are aspheric. Third lens L3 is a meniscus lens whose convex surface is on the object side.

Next, the lenses in second lens group G2 will be described. Fourth lens L4 is a meniscus lens whose convex surface is on the object side. The convex surface on the object side and the concave surface on the image side of fourth lens L4 are aspheric. Fifth lens L5 is a meniscus lens whose concave surface is on the object side. The concave surface on the object side of fifth lens L5 is aspheric. Sixth lens L6 is a biconcave lens. Seventh lens L7 is a biconvex concave lens.

Next, the lenses in third lens group G3 will be described. Eighth lens L8 is a biconvex concave lens. The convex surfaces on the object and image sides of eighth lens L8 are aspheric.

In the zoom lens system, when zooming from the wide angle extremity to the telephoto extremity when imaging, second lens group G2 moves to the object side, and first lens group G1, third lens group G3, and imaging surface S do not move. In other words, when zooming, second lens group G2 moves along the optical axis such that the distance between first lens group G1 and second lens group G2 decreases and the distance between second lens group G2 and third lens group G3 increases.

Embodiment 5

Figure 9:
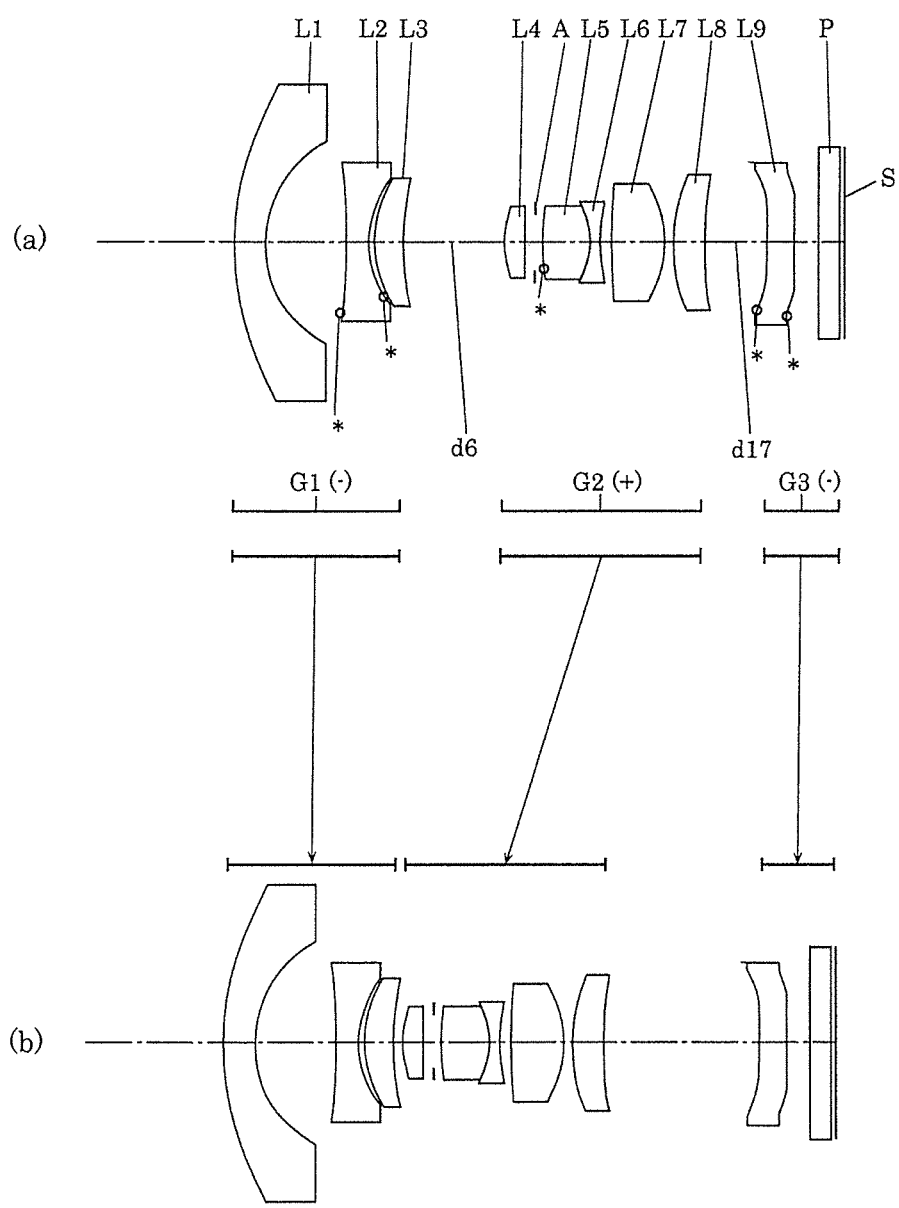
FIG. 9 illustrates the lens arrangement of a zoom lens system according to Embodiment 5 (Value Implementation Example 5)
Figure 10:
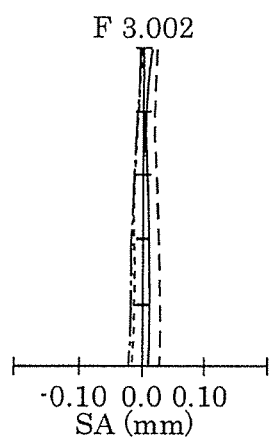
FIG. 10 illustrates longitudinal aberration when in the infinity focusing state according to Value Implementation Example 5.
Figure 10:
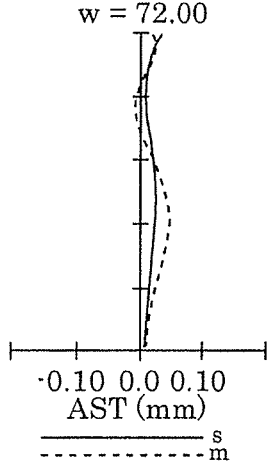
Figure 10:
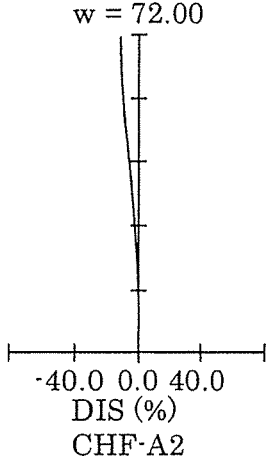
Figure 10:
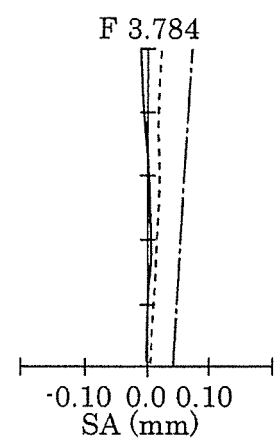
Figure 10:
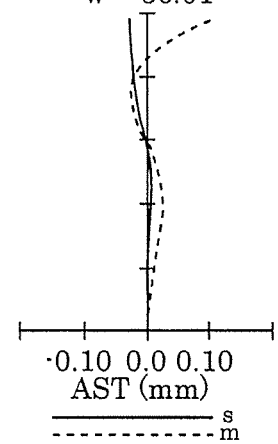
Figure 10:
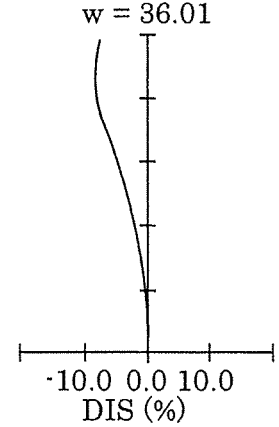

FIG. 9 illustrates a zoom lens system according to Embodiment 5.

The zoom lens system includes, in order from the object side to the image side, first lens group G1 having negative power, second lens group G2 having positive power, third lens group G3 having negative power, and parallel plate P.

First lens group G1 includes, in order from the object side to the image side, first lens L1 having negative power, second lens L2 having negative power, and third lens L3 having positive power.

Second lens group G2 includes, in order from the object side to the image side, fourth lens L4 having positive power, aperture A, fifth lens L5 having positive power, sixth lens L6 having negative power, seventh lens L7 having positive power, and eighth lens L8 having positive power. Fifth lens L5 and sixth lens L6 are bonded together with an adhesive, for example, so as to constitute a cemented lens.

Third lens group G3 includes ninth lens L9 having negative power.

Next, each lens will be described.

First, the lenses in first lens group G1 will be described. First lens L1 is a meniscus lens whose convex surface is on the object side. Second lens L2 is a biconcave lens. The concave surfaces on the object and imaging surface sides of second lens L2 are aspheric. Third lens L3 is a meniscus lens whose convex surface is on the object side.

Next, the lenses in second lens group G2 will be described. Fourth lens L4 is a biconvex concave lens. Fifth lens L5 is a biconvex concave lens. The convex surface on the object side of fifth lens L5 is aspheric. Sixth lens L6 is a biconcave lens. Seventh lens L7 is a biconvex concave lens. Eighth lens L8 is a meniscus lens whose convex surface is on the object side.

Next, the lenses in third lens group G3 will be described. Ninth lens L9 is a meniscus lens whose convex surface is on the object side. The convex surface on the object side and the concave surface on the image side of ninth lens L9 are aspheric.

In the zoom lens system, when zooming from the wide angle extremity to the telephoto extremity when imaging, second lens group G2 moves to the object side, and first lens group G1, third lens group G3, and imaging surface S do not move. In other words, when zooming, second lens group G2 moves along the optical axis such that the distance between first lens group G1 and second lens group G2 decreases and the distance between second lens group G2 and third lens group G3 increases.

Embodiment 6

Figure 11:
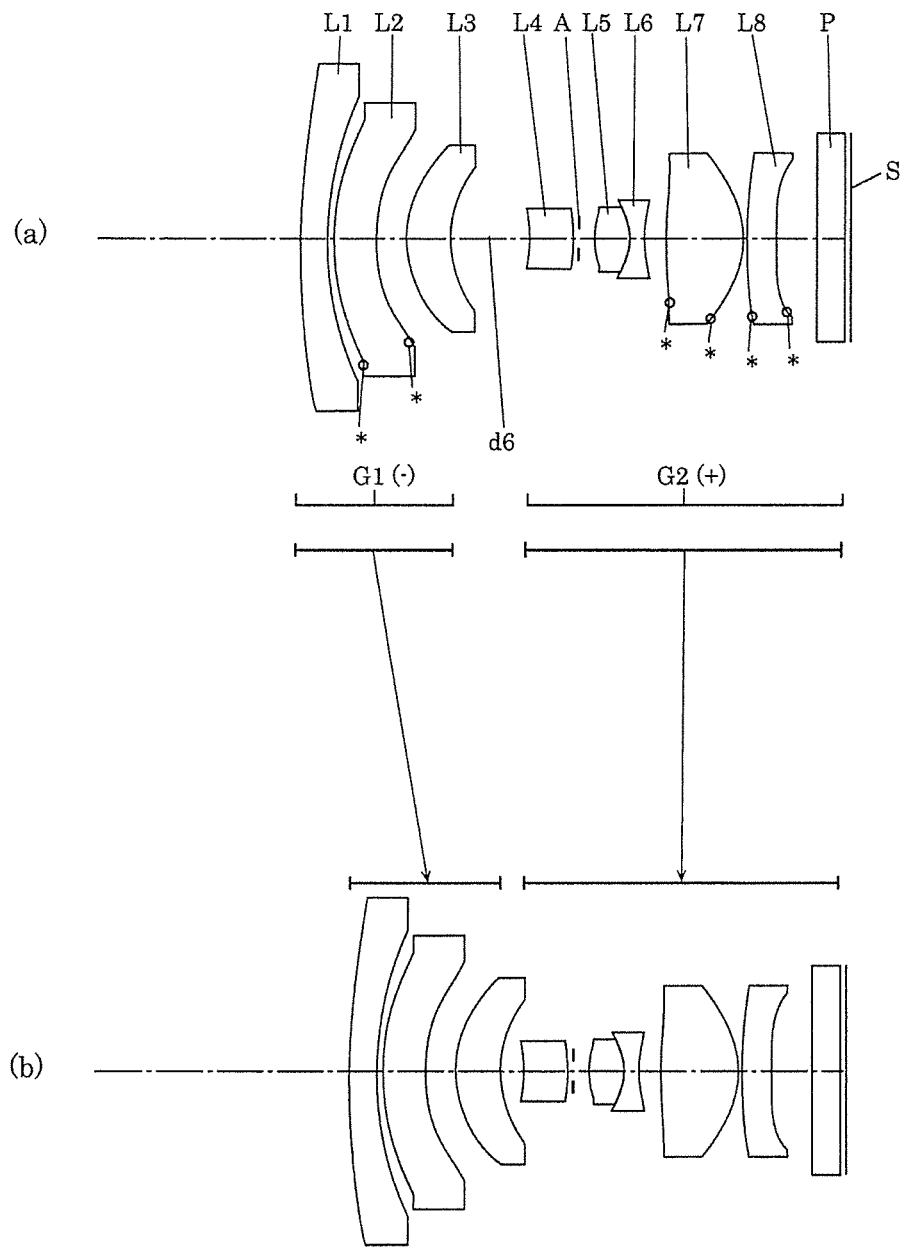
FIG. 11 illustrates the lens arrangement of a zoom lens system according to Embodiment 6 (Value Implementation Example 6)
Figure 12:
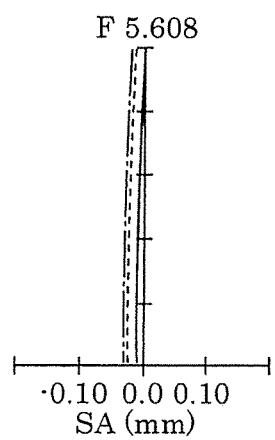
FIG. 12 illustrates longitudinal aberration when in the infinity focusing state according to Value Implementation Example 6.
Figure 12:
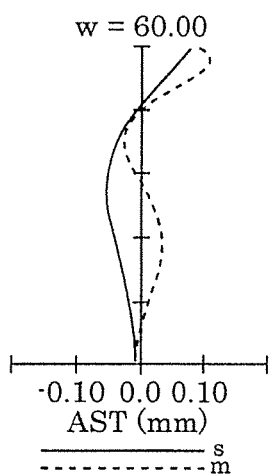
Figure 12:
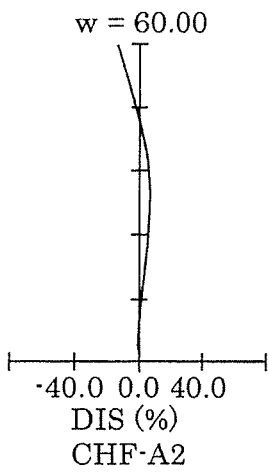
Figure 12:
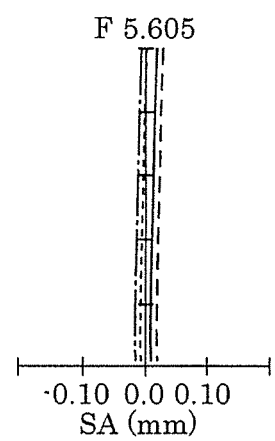
Figure 12:
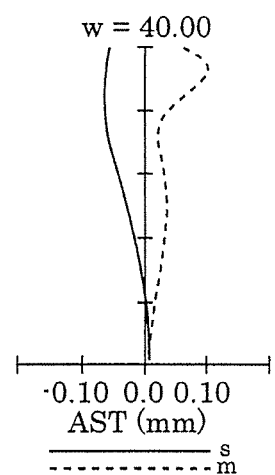
Figure 12:
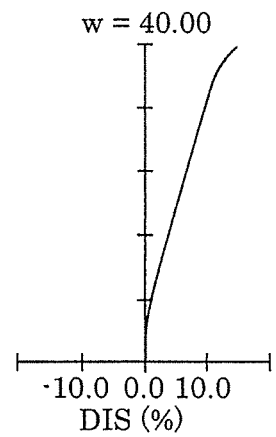

FIG. 11 illustrates a zoom lens system according to Embodiment 6.

The zoom lens system includes, in order from the object side to the image side, first lens group G1 having negative power, second lens group G2 having positive power, and parallel plate P.

First lens group G1 includes, in order from the object side to the image side, first lens L1 having negative power, second lens L2 having negative power, and third lens L3 having positive power.

Second lens group G2 includes, in order from the object side to the image side, fourth lens L4 having positive power, aperture A, fifth lens L5 having positive power, sixth lens L6 having negative power, seventh lens L7 having positive power, and eighth lens L8 having positive power. Fifth lens L5 and sixth lens L6 are bonded together with an adhesive, for example, so as to constitute a cemented lens.

Next, each lens will be described.

First, the lenses in first lens group G1 will be described. First lens L1 is a meniscus lens whose convex surface is on the object side. Second lens L2 is a meniscus lens whose convex surface is on the object side. The convex surface on the object side and the concave surface on the imaging surface side of second lens L2 are aspheric. Third lens L3 is a meniscus lens whose convex surface is on the object side.

Next, the lenses in second lens group G2 will be described. Fourth lens L4 is a meniscus lens whose concave surface is on the object side. Fifth lens L5 is a biconvex concave lens. Sixth lens L6 is a biconcave lens. Seventh lens L7 is a biconvex concave lens. The convex surfaces on the object and imaging surface sides of seventh lens L7 are aspheric. Eighth lens L8 is a meniscus lens whose convex surface is on the object side. The convex surface on the object side and the concave surface on the image side of eighth lens L8 are aspheric.

In the zoom lens system, when zooming from the wide angle extremity to the telephoto extremity when imaging, first lens group G1 moves to the imaging surface side, and second lens group G2 and imaging surface S do not move. In other words, when zooming, first lens group G1 moves along the optical axis such that the distance between first lens group G1 and second lens group G2 decreases and the distance between second lens group G2 and imaging surface S remains the same.

Conditions and Advantageous Effects, Etc.

Hereinafter, conditions that, for example, the zoom lens systems according to Embodiments 1 through 6 can satisfy will be described. Note that plural satisfiable conditions are stipulated for the zoom lens systems according to Embodiments 1 through 6; a zoom lens system configured to satisfy all of the conditions is most effective. However, it is possible to achieve a zoom lens system that yields individual advantageous effects by satisfying the individual conditions they correspond to.

A zoom lens system includes, in order from the object side to the image side, first lens group G1 having negative power, and second lens group G2 having positive power. First lens group G1 includes at least two negative lenses.

When zooming, one of first lens group G1 and second lens group G2 is fixed relative to imaging surface S.

The other of first lens group G1 and second lens group G2 moves along the optical axis. This changes the angle of view.

With this, as a result of first lens group G1 including at least two negative lenses, it is possible to beneficially correct various aberrations.

Moreover, as a result of one of first lens group G1 and second lens group G2 being fixed, the outer diameter of the lens can be reduced across the entire length of the lens.

Moreover, it is possible to achieve a lens system having a fixed length and a reduced lens outer diameter across its entire length by fixing first lens group G1 and making second lens group G2 movable. It is also possible to reduce the size and weight of the mechanism for moving second lens group G2, which is relatively light.

Moreover, by fixing to lens frame 101 (see FIG. 13) the lens group disposed closest to the object, it is easier to prevent foreign matter such as liquid and dust from entering the lens system (lens frame 101), and possible to achieve a zoom lens system having superior compactness, waterproof, and dust-proof characteristics.

Moreover, the zoom lens system is also usable as a two-focus lens system whose two focal lengths are defined by the wide angle extremity and the telephoto extremity. With such a two-focus lens system, there is no need to take the optical performance of the midrange of the zoom range into consideration, which makes it easier to further improve optical performance at the wide angle extremity and telephoto extremity.

Moreover, for example, the total angle of view at the wide angle extremity is preferably at least 120 degrees.

This makes it possible to see a wide image all at once.

Note that by increasing the total angle of view at the wide angle extremity to at least 140 degrees, it is possible to further improve the above-described advantageous effect.

Note that by increasing the total angle of view at the wide angle extremity to at least 180 degrees, it is possible to further improve the above-described advantageous effect.

Moreover, for example, the zoom lens system preferably further includes third lens group G3 having positive power, and third lens group G3 is preferably fixed relative to imaging surface S.

This makes it possible to beneficially correct, among various types of aberrations, curvature of field and astigmatism in particular, which makes it easier to improve optical performance throughout the entire zoom range from the wide angle extremity to the telephoto extremity. Moreover, by fixing third lens group G3 relative to imaging surface S, it eliminates the need to provide a new lens group driving mechanism, which reduces cost and maintains the compactness of the zoom lens system.

Moreover, for example, the zoom lens system preferably further includes third lens group G3 having negative power, and third lens group G3 is preferably fixed relative to imaging surface S.

This makes it possible for the rear principal point on the side of L1 in the zoom lens system opposite the object-side surface to be located closer to the object, which makes it possible to reduce the overall optical length and reduce the lens outer diameter. Moreover, by fixing third lens group G3 relative to imaging surface S, it eliminates the need to provide a new lens group driving mechanism, which reduces cost and maintains the compactness of the zoom lens system.

Moreover, for example, the lens closest to the object in first lens group G1 preferably has negative power and a refractive index of at least 1.8.

This makes it possible to increase the curvature radius of the lens. Accordingly, the angle of inclination in the surrounding area of the lens can be made less steep, which makes the lens easier to manufacture and reduces cost.

Note that by increasing the refractive index of the lens to at least 1.9, it is possible to further improve the above-described advantageous effect.

Moreover, for example, the lens closest to the image in first lens group G1 preferably has positive power and a refractive index of at least 1.9.

This makes it possible to beneficially correct curvature of field and astigmatism on the wide angle side in particular, which makes it easier to improve optical performance on the wide angle side in particular.

Note that by increasing the refractive index of the lens to at least 2.0, it is possible to further improve the above-described advantageous effect.

Note that by increasing the refractive index of the lens to at least 2.1, it is possible to further improve the above-described advantageous effect.

Moreover, for example, second lens group G2 preferably includes a cemented lens having negative power, and the following condition (1) is preferably satisfied.

$$-1.50 < fG2/fCL < -0.05 \quad (1)$$

Here, fG2 is the focal length along the d-line of second lens group G2, and fCL is the focal length along the d-line of the cemented lens.

Condition (1) is a condition for stipulating the power ratio of the cemented lens to second lens group G2.

When the lower limit of condition (1) is exceeded, the power ratio of the cemented lens to second lens group G2 becomes exceedingly high, whereby spherical aberration and coma aberration increase throughout the entire zoom range from the wide angle extremity to the telephoto extremity, making it difficult to achieve sufficient aberration correction and secure a desired level of optical performance. Moreover, when the upper limit of condition (1) is exceeded, the power ratio of the cemented lens to second lens group G2 becomes exceedingly low, leading to the use of more lenses in second lens group G2, which would increase the size of the zoom lens system.

Note that it is possible to further achieve the above-described advantageous effects by further satisfying at least one of the following conditions (1a) and (1b).

$$-1.20 < fG2/fCL \quad (1a)$$

$$fG2/fCL < -0.10 \quad (1b)$$

Note that it is possible to further achieve the above-described advantageous effects by further satisfying at least one of the following conditions (1a)' and (1b)'.

$$-0.70 < fG2/fCL \quad (1a)'$$

$$fG2/fCL < -0.15 \quad (1b)'$$

Moreover, for example, the cemented lens preferably includes a positive lens and a negative lens, and satisfies the following condition (2).

$$1.0 < vp/vn < 4.0 \quad (2)$$

Here, vp is the Abbe number for the positive lens, and vn is the Abbe number for the negative lens.

Note that the Abbe number is sometimes expressed as "ν"; in the present specification and appended claims, for consistency with the surface data found below, the Abbe number is expressed using "v".

Condition (2) is a condition for stipulating the ratio of the Abbe number for the positive lens and the Abbe number for the negative lens in the cemented lens having negative power.

When the lower and upper limit of condition (2) is exceeded, chromatic aberration along the axis on the telephoto side in particular increases, making it difficult to achieve sufficient aberration correction and secure a desired level of optical performance.

Note that it is possible to further achieve the above-described advantageous effects by further satisfying at least one of the following conditions (2a) and (2b).

$$1.6 < vp/vn \quad (2a)$$

$$vp/vn < 3.5 \quad (2b)$$

Note that it is possible to further achieve the above-described advantageous effects by further satisfying the following condition (2a)'.

$$2.5 < vp/vn \quad (2a)'$$

Moreover, for example, the following condition (3) is preferably satisfied.

$$-2.0 < 1/(fG1/(2 \times fW \times \tan(wW/2))) < -0.5 \quad (3)$$

Here, fG1 is the focal length along the d-line of first lens group G1, fW is the focal length along the d-line of the wide angle extremity, and wW is the half angle of view at the wide angle extremity.

Condition (3) is a condition for stipulating the negative power of first lens group G1. When the lower limit of condition (3) is exceeded, the negative power of first lens group G1 becomes exceedingly high, whereby curvature of field and astigmatism increase on the wide angle side in particular, making it difficult to achieve sufficient aberration correction and secure a desired level of optical performance. Moreover, when the upper limit of condition (3) is exceeded, the negative power of first lens group G1 becomes exceedingly low, making it difficult to broaden the total angle of view at the wide angle extremity, which would lead to an increase in the size of the zoom lens system.

Note that it is possible to further achieve the above-described advantageous effects by further satisfying at least one of the following conditions (3a) and (3b).

$$-1.8 < 1/(fG1/(2 \times fW \times \tan(wW/2))) \quad (3a)$$

$$1/(fG1/(2 \times fW \times \tan(wW/2))) < -0.9 \quad (3b)$$

Note that it is possible to further achieve the above-described advantageous effects by further satisfying the following condition (3a)'.

$$-1.1 < 1/(fG1/(2 \times fW \times \tan(wW/2))) \quad (3a);$$

Embodiment 7

Figure 13:
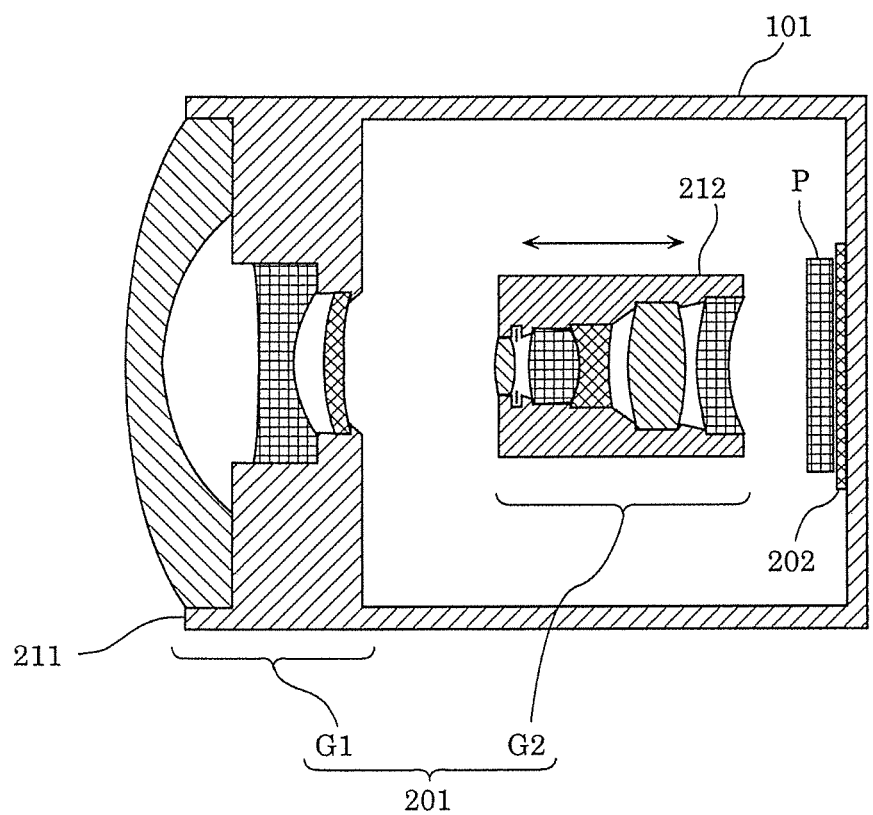
FIG. 13 schematically illustrates an imaging device according to Embodiment 7.

FIG. 13 schematically illustrates imaging device 100 implemented with a zoom lens system according to Embodiment 1.

Imaging device 100 according to this embodiment is capable of outputting an optical image of an object as an electric image signal, and includes zoom lens system 201 that forms an optical image of an object, imaging element 202 that converts the optical image formed by zoom lens system 201 into an electric image signal, and lens tube 101 that houses zoom lens system 201.

Zoom lens system 201 includes first lens group G1 held by first group frame 211, second lens group G2 held by second group frame 212, and parallel plate P.

A controller (not illustrated) inside imaging device 100 controls an actuator (not illustrated) when zooming, and moves second lens group G2 via second group frame 212. In this way, in this embodiment, imaging device 100 includes zoom lens system 201 according to Embodiment 1.

Accordingly, it is possible to provide an imaging device having a high level of optical performance across the entire zoom range from the wide angle extremity to the telephoto extremity, and having a wide total angle of view at the wide angle extremity.

Note that any zoom lens system according to Embodiments 2 through 5 may be implemented in place of a zoom lens system according to Embodiment 1.

Embodiment 8

Figure 14:
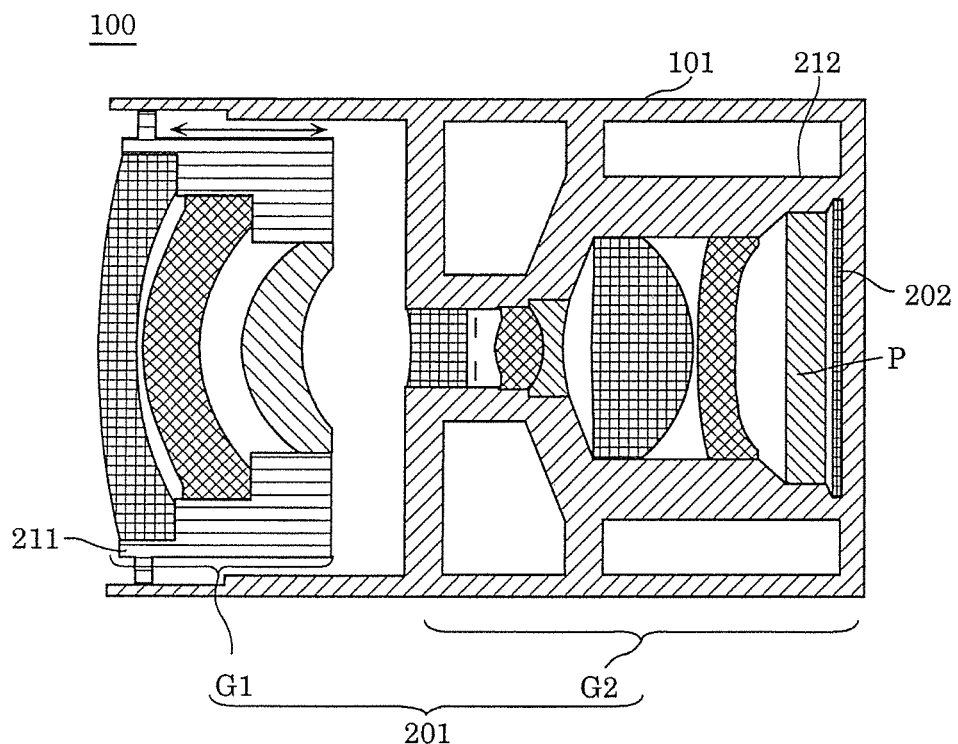
FIG. 14 schematically illustrates an imaging device according to Embodiment 8.

FIG. 14 schematically illustrates imaging device 100 implemented with a zoom lens system according to Embodiment 6.

Imaging device 100 according to this embodiment is capable of outputting an optical image of an object as an electric image signal, and includes zoom lens system 201 that forms an optical image of an object, imaging element 202 that converts the optical image formed by zoom lens system 201 into an electric image signal, and lens tube 101 that houses zoom lens system 201.

Zoom lens system 201 includes first lens group G1 held by first group frame 211, second lens group G2 held by second group frame 212, and parallel plate P.

A controller (not illustrated) inside imaging device 100 controls an actuator (not illustrated) when zooming, and moves first lens group G1 via first group frame 211.

In this way, in this embodiment, imaging device 100 includes zoom lens system 201 according to Embodiment 1.

Accordingly, it is possible to provide an imaging device having a high level of optical performance across the entire zoom range from the wide angle extremity to the telephoto extremity, and having a wide total angle of view at the wide angle extremity.

Embodiment 9

Figure 15:
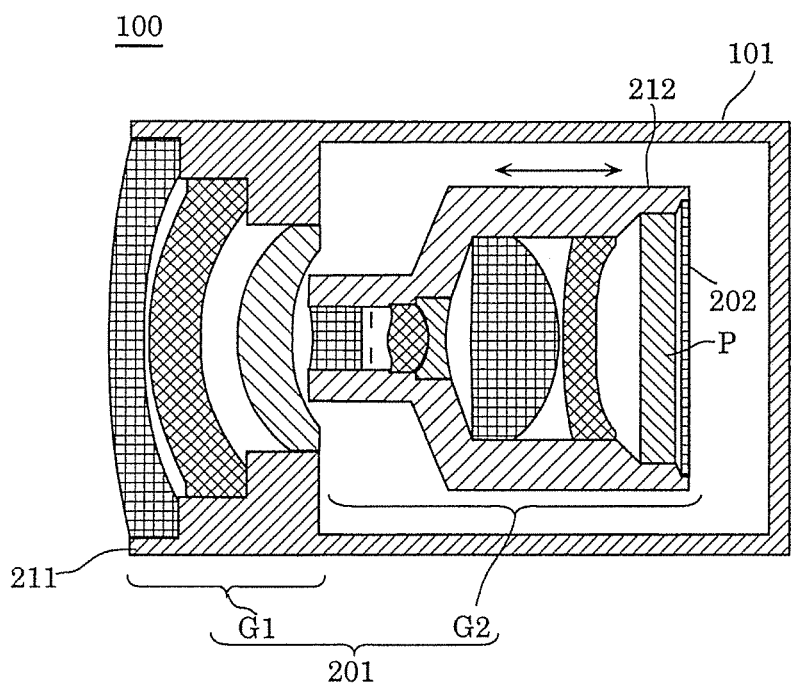
FIG. 15 schematically illustrates an automobile according to Embodiment 9.

FIG. 15 schematically illustrates imaging device 100 implemented with a zoom lens system according to Embodiment 6.

Imaging device 100 according to this embodiment is capable of outputting an optical image of an object as an electric image signal, and includes zoom lens system 201 that forms an optical image of an object, imaging element 202 that converts the optical image formed by zoom lens system 201 into an electric image signal, and lens tube 101 that houses zoom lens system 201.

Imaging device 100 includes first lens group G1 held by first group frame 211, second lens group G2 held by second group frame 212, parallel plate P, and imaging element 202.

A controller (not illustrated) inside imaging device 100 controls an actuator (not illustrated) when zooming, and moves second lens group G2, parallel plate P, and imaging element 202 via second group frame 212. In other words, the distance between second lens group G2 and imaging element 202 is fixed, and the distance between first lens group G1 and imaging element 202 varies. With this embodiment, second lens group G2 can be fixedly held in only two positions—the wide angle extremity and the telephoto extremity positions.

This makes it possible to change the distance between lens tube 101 and imaging element 202 without moving first lens group G1, which ensures the dust-proof performance and waterproof performance of lens tube 101, and secures a desired level of performance for the zoom lens system.

Embodiment 10

Figure 16:
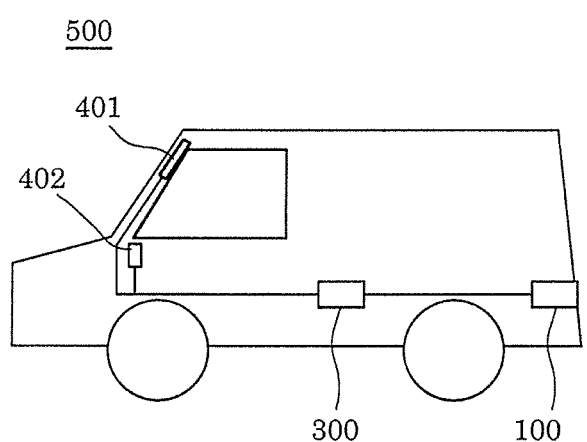
FIG. 16 schematically illustrates an imaging device according to Embodiment 10.

FIG. 16 schematically illustrates vehicle 500 implemented with imaging device 100 according to any one of Embodiments 7 through 9. Vehicle 500 includes imaging element 202 that receives an optical image formed via zoom lens system 201 in imaging device 100 and converts the optical image into an electric image signal, display device 401 that displays the image signal converted by imaging element 202, memory (not illustrated) that stores an image signal, and controller 300 that controls the zoom position of zoom lens system 201.

For example, imaging device 100 is disposed at the rear of vehicle 500 and images an area behind the vehicle.

For example, controller 300 controls the zoom position of zoom lens system 201 in accordance with the direction of travel and/or speed of the vehicle. For example, controller 300 changes the zoom position of zoom lens system 201 to be at the telephoto side or telephoto extremity when traveling forward and at the wide angle side or wide angle extremity when traveling in reverse. Moreover, for example, controller 300 changes the zoom position of zoom lens system 201 to be at the telephoto side or telephoto extremity when traveling at high speeds and at the wide angle side or wide angle extremity when traveling at low speeds.

Imaging element 202 receives an optical image formed by zoom lens system 201 and converts the optical image into an electric image signal.

The image signal obtained via imaging element 202 is, for example, display on display device 401 or display device 402, etc., which are disposed inside and in the forward region of vehicle 500. Moreover, the image signal is, for example, stored in memory as image data.

Display device 401 is, for example, an electron rear view mirror.

Display device 402 is, for example, a car navigation system or a dashboard display device.

This makes it possible for vehicle 500 to use imaging device 100 having a single optical system to display video captured at the telephoto side for relatively far areas in the rearward direction and video captured at the wide angle side for relatively close areas. Accordingly, passengers such as the driver can visually confirm the area behind vehicle 500.

When imaging device 100 according to Embodiment 7 or Embodiment 9 is implemented in vehicle 500, the entire length of lens tube 101 can be fixed when zooming. Accordingly, when required to withstand tough environments, such as is required when equipped the outside of the vehicle, even in tough environments, the dust-proof and waterproof performance of lens tube 101 can be ensured and a desired level of performance of the zoom lens system can be secured. This makes it easier to equip on the outside of the vehicle.

Other Embodiments

Hereinbefore, techniques disclosed in the present application have been exemplified by way of Embodiments 1 through 10. However, the techniques disclosed in the present disclosure are not limited to these examples; modifications, replacements, additions, and omissions may be made. Moreover, various elements described in Embodiments 1 through 10 may be combined to realize a new embodiment.

In view of this, hereinafter, examples of other embodiments will be given.

A lens that essentially has no power may be added to a zoom lens system according to any one of Embodiments 1 through 6.

As one example of a zoom lens system according to any one of Embodiments 1 through 6, an example of a zoom lens system capable of changing its zoom position continuously from the wide angle extremity to the telephoto extremity was given. It is sufficient if the focal length of the zoom lens system is changeable. Accordingly, the zoom lens system is not limited to a zoom lens system whose focal length continuously changes. The zoom lens system may be a multifocal lens system that switches between two or more focal lengths using some of the zoom positions in the zoom lens systems according to Embodiments 1 through 6. Moreover, the zoom lens system may be a two-focus switchable lens system that switches between the two focal lengths defined by the wide angle extremity and the telephoto extremity. When the zoom lens system is a two-focus switchable lens system, there is no need to take the optical performance of the midrange of the zoom range into consideration, which makes it easier to further improve optical performance at the wide angle extremity and telephoto extremity. This also simplifies the mechanism for switching focal lengths, such as an actuator. Accordingly, even when required to withstand tough environments, such as is required when equipped on, for example, vehicles, it is possible to provide an imaging device capable of switching focal lengths. Moreover, it is possible to provide an imaging device capable of rapidly moving between the two focal points. Moreover, since there is no need to maintain zoom position at an intermediate focal length, it is possible to reduce power consumption.

In one example, imaging device 100 was described as being disposed at the rear of vehicle 500, given as one example of a vehicle according to Embodiment 10, and imaging an area behind the vehicle. The location in which imaging device 100 is disposed and the direction in which imaging device 100 images are not limited to this example.

Imaging device 100 may be disposed in each of the two locations where the side mirrors are positioned on the sides of the vehicle, and may be used in place of side mirrors by imaging areas to the sides and rear of the vehicle. For example, the zoom position of zoom lens system 201 may be controlled in accordance with the direction of travel and/or speed of the vehicle such that the zoom position is on the telephoto side when traveling forward and on the wide angle side when traveling in reverse. This makes it possible to reduce blind spots when traveling in reverse such as when backing into a parking spot. Moreover, the zoom positions of the two imaging devices 100 may be controlled so as to be the same, or may be controlled such that the zoom position of only imaging device 100 attached to the side mirror located on side opposite the driver side is on the wide angle side when, for example, parking.

Imaging device 100 may be disposed on the inner surface of the windshield inside the vehicle (i.e., in front of the rear-view mirror) and image an area in front of the vehicle. This makes it possible to use imaging device 100 as an in-car camera or sensor camera for a driving assistance system.

Value Implementation Examples

Hereinafter, value implementation examples for the zoom lens systems according to Embodiments 1 through 6 will be given. Note that in the value implementation examples, the unit of length is denoted as "mm" and the unit for angle of view is denoted as "°". Moreover, in each of the value implementation examples, "r" is curvature radius, "d" is distance between surfaces, "nd" is refractive index relative to the d-line, and "vd" is the Abbe number relative to the d-line. Moreover, in each of the value implementation examples, surfaces marked with an asterisk are aspheric surfaces, whose shapes are defined by the following equation.

$$Z = \frac{h^2/r}{1+\sqrt{1-(1+\kappa)(h/r)^2}} + \sum A_n h^n \qquad \text{MATH. 1}$$

Here, "Z" is the distance from a point on the aspheric surface at a height h from the optical axis to a tangent plane of the peak of the aspheric surface, "h" is height from the optical axis, "r" is the peak curvature radius, "x" is the conic constant, and "An" is the n-th order aspheric coefficient.

FIG. 2, FIG. 4, FIG. 6, FIG. 8, FIG. 10, and FIG. 12 respectively illustrate longitudinal aberration when zoom lens systems according to Value Implementation Examples 1 through 6 are in the infinity focusing state.

In each drawing illustrating longitudinal aberration, (a) illustrates aberration at the wide angle extremity and (b) illustrates aberration at the telephoto extremity. In each drawing illustrating longitudinal aberration, in order from top to bottom, spherical aberration (SA (mm)), astigmatism (AST (mm)), and distortion (DIS (%)) are illustrated.

In each spherical aberration illustration, F number (marked as "F" in the drawings) is represented on the vertical axis, the solid line represents the d-line, the short dashed line represents the F-line, the long dashed line represents the C-line, and the dotted and dashed line represents the g-line.

In each astigmatism illustration, image height is represented on the vertical axis, the solid line represents the sagittal plane (marked as "s" in the drawings), and the dashed line represents the meridional plane (marked as "m" in the drawings). Note that "w" indicates the half angle of view.

In each distortion illustration, image height is represented on the vertical axis, and w indicates the half angle of view.

Here, the solid line representing distortion at the wide angle extremity in the illustrations in (a) indicates aberration when the ideal image height is Y=2×fW×tan(wW/2), and the solid line representing distortion at the telephoto extremity in the illustrations in (b) indicates aberration when the ideal image height is Y=fT×tan(wT), where "Y" is image height, "fW" is focal length at the wide angle extremity, "fT" is focal length at the telephoto extremity, "wW" is the half angle of view at the wide angle extremity, and "wT" is the half angle of view at the telephoto extremity.

Value Implementation Example 1

The zoom lens system according to Value Implementation Example 1 corresponds to Embodiment 1 illustrated in FIG. 1 Various types of data for the zoom lens system according to Value Implementation Example 1 is indicated in Data 1.

(Data 1)

SURFACE DATA

| SURFACE NUMBER | r | d | nd | vd |
|---|---|---|---|---|
| OBJECT SURFACE | ∞ | | | |
| 1 | 11.84800 | 1.00000 | 2.00100 | 29.1 |
| 2 | 4.84380 | 3.53750 | | |
| 3* | −24.49860 | 0.70000 | 1.80998 | 40.9 |
| 4* | 2.77250 | 1.02990 | | |
| 5 | 5.33230 | 0.61240 | 2.10420 | 17.0 |
| 6 | 10.71420 | VARIABLE | | |
| 7 | 6.98800 | 0.47500 | 1.84666 | 23.8 |
| 8 | −10.61710 | 0.10000 | | |
| 9 (DIAPHRAGM) | ∞ | 0.36510 | | |
| 10* | 4.41890 | 1.49180 | 1.68893 | 31.1 |
| 11 | −1.97030 | 0.00500 | 1.56732 | 42.8 |
| 12 | −1.97030 | 0.70000 | 2.00272 | 19.3 |
| 13 | 5.07480 | 0.59380 | | |
| 14 | 6.09700 | 1.76240 | 1.60311 | 60.7 |
| 15 | −5.06070 | 0.10920 | | |
| 16* | 4.92620 | 1.00000 | 2.00272 | 19.3 |
| 17* | 4.85440 | VARIABLE | | |
| 18 | ∞ | 0.70000 | 1.51680 | 64.2 |
| 19 | ∞ | 0.10000 | | |
| 20 | ∞ | BF | | |
| IMAGING SURFACE | ∞ | | | |

ASPHERIC SURFACE DATA

THIRD SURFACE

K = 0.00000E+00, A4 = −1.42010E−03, A6 = 2.12200E−04,
A8 = −7.06042E−06 A10 = 1.81078E−08
FOURTH SURFACE

K = −1.83138E−03, A4 = −5.38722E−03, A6 = 6.69074E−04,
A8 = −6.39084E−06 A10 = −2.00828E−06
TENTH SURFACE

K = 0.00000E+00, A4 = 5.64426E−03, A6 = −1.00646E−02,
A8 = 2.26343E−02 A10 = −1.38613E−02
SIXTEENTH SURFACE

K = −8.78920E−01, A4 = 3.45772E−03, A6 = −8.57563E−04,
A8 = −3.31787E−05 A10 = −3.64830E−06
SEVENTEENTH SURFACE

K = 9.51784E−01, A4 = 7.70165E−03, A6 = −1.65490E−03,
A8 = −3.03580E−05 A10 = 1.67798E−10

VARIOUS DATA
ZOOM RATIO 2.65369

| | WIDE ANGLE | TELEPHOTO |
|---|---|---|
| FOCAL LENGTH | 1.6603 | 4.4060 |
| F NUMBER | 4.00183 | 6.24434 |
| ANGLE OF VIEW | 101.0000 | 36.8610 |
| IMAGE HEIGHT | 2.5662 | 3.0000 |
| LENS LENGTH | 21.0000 | 21.0000 |
| BF | 0.00000 | 0.00000 |
| d6 | 4.4335 | 0.1004 |
| d17 | 2.2844 | 6.6175 |
| ENTRANCE PUPIL POSITION | 4.4811 | 3.9741 |
| EXIT PUPIL POSITION | −7.8866 | −12.2197 |
| FRONT PRINCIPAL POINT POSITION | 5.7924 | 6.7902 |
| REAR PRINCIPAL POINT POSITION | 19.3496 | 16.5840 |

SINGLE LENS DATA

| LENS | FIRST SURFACE | FOCAL LENGTH |
|---|---|---|
| 1 | 1 | −8.8149 |
| 2 | 3 | −3.0400 |
| 3 | 5 | 9.0720 |
| 4 | 7 | 5.0398 |
| 5 | 10 | 2.1862 |
| 6 | 12 | −1.3483 |

-continued (Data 1)

| | | |
|---|---|---|
| 7 | 14 | 4.8748 |
| 8 | 16 | 55.6072 |

ZOOM LENS GROUP DATA

| GROUP | FIRST SUR-FACE | FOCAL LENGTH | LENS CONFIG. LENGTH | FRONT PRINCIPAL POINT POSITION | REAR PRINCIPAL POINT POSITION |
|---|---|---|---|---|---|
| 1 | 1 | −2.71096 | 6.87980 | 2.47801 | 4.01573 |
| 2 | 7 | 4.25863 | 6.60230 | 1.20346 | 2.59129 |

ZOOM LENS GROUP MAGNIFICATION

| GROUP | FIRST SURFACE | WIDE ANGLE | TELEPHOTO |
|---|---|---|---|
| 1 | 1 | 0.00000 | 0.00000 |
| 2 | 7 | −0.61246 | −1.62527 |

Value Implementation Example 2

The zoom lens system according to Value Implementation Example 2 corresponds to Embodiment 2 illustrated in FIG. 3. Various types of data for the zoom lens system according to Value Implementation Example 2 is indicated in Data 2.

(Data 2)

SURFACE DATA

| SURFACE NUMBER | r | d | nd | vd |
|---|---|---|---|---|
| OBJECT SURFACE | ∞ | | | |
| 1 | 16.74040 | 1.00000 | 1.91082 | 35.2 |
| 2 | 6.19370 | 4.97660 | | |
| 3* | −117.52060 | 1.04030 | 1.80998 | 40.9 |
| 4* | 2.00090 | 1.35170 | | |
| 5 | 6.75820 | 1.15720 | 2.10420 | 17.0 |
| 6 | 32.80640 | VARIABLE | | |
| 7* | 3.40560 | 1.04000 | 1.83918 | 23.9 |
| 8* | 6.90940 | 0.50000 | | |
| 9 (DIAPHRAGM) | ∞ | 0.22230 | | |
| 10 | 4.03370 | 1.43240 | 1.58913 | 61.3 |
| 11 | −2.50000 | 0.00500 | 1.56732 | 42.8 |
| 12 | −2.50000 | 0.95580 | 1.94595 | 18.0 |
| 13 | 14.32650 | 1.16490 | | |
| 14* | 3.33750 | 1.28200 | 1.68893 | 31.1 |
| 15* | 10.20320 | VARIABLE | | |
| 16* | 6.86050 | 1.38800 | 1.77200 | 50.0 |
| 17* | −8.62460 | 0.70200 | | |
| 18 | ∞ | 0.70000 | 1.51680 | 64.2 |
| 19 | ∞ | 0.10000 | | |
| 20 | ∞ | BF | | |
| IMAGING SURFACE | ∞ | | | |

ASPHERIC SURFACE DATA

THIRD SURFACE

K = 5.00000E+02, A4 = −3.79945E−03, A6 = 2.91587E−04,
A8 = −1.08682E−05 A10 = 1.63700E−07
FOURTH SURFACE

K = −7.45380E−01, A4 = −1.34302E−02, A6 = 3.56576E−04,
A8 = 1.22068E−05 A10 = −2.64577E−06
SEVENTH SURFACE

K = −1.28353E+00, A4 = 6.42054E−03, A6 = 9.77481E−04,
A8 = −7.63095E−05 A10 = 5.64541E−05

-continued (Data 2)

EIGHTH SURFACE

K = 0.00000E+00, A4 = 4.43274E−03, A6 = 1.03201E−03,
A8 = 5.21289E−05 A10 = 9.29893E−05
FOURTEENTH SURFACE

K = 2.14915E−01, A4 = 1.44982E−03, A6 = −6.08124E−04,
A8 = 1.81920E−05 A10 = 9.93346E−07
FIFTEENTH SURFACE

K = 0.00000E+00, A4 = 1.39849E−02, A6 = −1.33576E−04,
A8 = −7.23755E−06 A10 = −5.93264E−11
SIXTEENTH SURFACE

K = 0.00000E+00, A4 = −4.42218E−04, A6 = 2.53741E−04,
A8 = −5.72403E−05 A10 = 4.81152E−07
SEVENTEENTH SURFACE

K = 3.64412E+00, A4 = 9.39007E−03, A6 = −6.03189E−04,
A8 = −6.02825E−06 A10 = 1.64038E−07

VARIOUS DATA
ZOOM RATIO 3.01341

|  | WIDE ANGLE | TELEPHOTO |
|---|---|---|
| FOCAL LENGTH | 0.9947 | 2.9974 |
| F NUMBER | 2.06113 | 3.66045 |
| ANGLE OF VIEW | 101.0000 | 35.8360 |
| IMAGE HEIGHT | 1.9208 | 2.2000 |
| LENS LENGTH | 25.8394 | 25.8394 |
| BF | 0.00000 | 0.00000 |
| d6 | 6.2212 | 0.3000 |
| d15 | 0.6000 | 6.5212 |
| ENTRANCE PUPIL POSITION | 5.4543 | 5.1208 |
| EXIT PUPIL POSITION | 553.7391 | 7.8774 |
| FRONT PRINCIPAL POINT POSITION | 6.4507 | 9.2579 |
| REAR PRINCIPAL POINT POSITION | 24.8429 | 22.8366 |

SINGLE LENS DATA

| LENS | FIRST SURFACE | FOCAL LENGTH |
|---|---|---|
| 1 | 1 | −11.3045 |
| 2 | 3 | −2.4195 |
| 3 | 5 | 7.5328 |
| 4 | 7 | 7.0482 |
| 5 | 10 | 2.8516 |
| 6 | 12 | −2.1897 |
| 7 | 14 | 6.6899 |
| 8 | 16 | 5.1507 |

ZOOM LENS GROUP DATA

| GROUP | FIRST SUR-FACE | FOCAL LENGTH | LENS CONFIG. LENGTH | FRONT PRINCIPAL POINT POSITION | REAR PRINCIPAL POINT POSITION |
|---|---|---|---|---|---|
| 1 | 1 | −2.58954 | 9.52580 | 3.33477 | 5.46256 |
| 2 | 7 | 5.10700 | 6.60240 | 1.09978 | 2.08766 |
| 3 | 16 | 5.15068 | 2.79000 | 0.36113 | 1.17251 |

ZOOM LENS GROUP MAGNIFICATION

| GROUP | FIRST SURFACE | WIDE ANGLE | TELEPHOTO |
|---|---|---|---|
| 1 | 1 | 0.00000 | 0.00000 |
| 2 | 7 | −0.57597 | −1.73380 |
| 3 | 16 | 0.66690 | 0.66761 |

Value Implementation Example 3

The zoom lens system according to Value Implementation Example 3 corresponds to Embodiment 3 illustrated in FIG. 5. Various types of data for the zoom lens system according to Value Implementation Example 3 is indicated in Data 3.

(Data 3)
SURFACE DATA

| SURFACE NUMBER | r | d | nd | vd |
|---|---|---|---|---|
| OBJECT SURFACE | ∞ | | | |
| 1 | 11.24800 | 0.50000 | 2.00100 | 29.1 |
| 2 | 3.74730 | 2.80710 | | |
| 3* | −33.53600 | 0.50000 | 1.80998 | 40.9 |
| 4* | 2.90790 | 0.22950 | | |
| 5 | 3.25080 | 0.50000 | 2.10420 | 17.0 |
| 6 | 5.32250 | VARIABLE | | |
| 7 | 3.90160 | 0.56720 | 1.84666 | 23.9 |
| 8 | 86.51630 | 0.26770 | | |
| 9 (DIAPHRAGM) | ∞ | 0.26770 | | |
| 10* | 6.17720 | 0.86130 | 1.68893 | 31.1 |
| 11 | −3.00710 | 0.00600 | 1.56732 | 42.8 |
| 12 | −3.00710 | 0.30000 | 2.00272 | 19.3 |
| 13 | 5.69970 | 0.30000 | | |
| 14 | 21.09680 | 0.83790 | 1.63854 | 55.4 |
| 15 | −3.18920 | 0.30000 | | |
| 16 | 4.89670 | 0.53330 | 1.88300 | 40.8 |
| 17 | 7.42220 | VARIABLE | | |
| 18* | −5.78950 | 1.00000 | 1.82115 | 24.1 |
| 19* | −10.25850 | 0.92060 | | |
| 20 | ∞ | 0.70000 | 1.51680 | 64.2 |
| 21 | ∞ | 0.10000 | | |
| 22 | ∞ | BF | | |
| IMAGING SURFACE | ∞ | | | |

ASPHERIC SURFACE DATA

THIRD SURFACE

K = 0.00000E+00, A4 = −3.46699E−03, A6 = 3.04731E−04,
A8 = −1.43458E−05 A10 = 1.21014E−07
FOURTH SURFACE

K = 0.00000E+00, A4 = −2.87134E−03, A6 = 3.17550E−04,
A8 = −3.77317E−07 A10 = −1.99125E−06
TENTH SURFACE

K = 0.00000E+00, A4 = −8.28749E−03, A6 = 1.02678E−02,
A8 = −1.66571E−02 A10 = 8.96180E−03
EIGHTEENTH SURFACE

K = 0.00000E+00, A4 = −1.27485E−02, A6 = 1.01248E−04,
A8 = −9.31178E−07 A10 = −1.81223E−09
NINETEENTH SURFACE

K = 0.00000E+00, A4 = −8.03080E−03, A6 = 3.49428E−04,
A8 = 3.05150E−10 A10 = 5.41456E−13

VARIOUS DATA
ZOOM RATIO 2.48192

|  | WIDE ANGLE | TELEPHOTO |
|---|---|---|
| FOCAL LENGTH | 1.7766 | 4.4094 |
| F NUMBER | 3.50302 | 5.21491 |
| ANGLE OF VIEW | 101.0000 | 36.8240 |
| IMAGE HEIGHT | 2.5207 | 3.0000 |
| LENS LENGTH | 17.0000 | 17.0000 |
| BF | 0.00000 | 0.00000 |
| d6 | 3.6539 | 0.3000 |
| d17 | 1.8478 | 5.2017 |
| ENTRANCE PUPIL POSITION | 3.2625 | 2.7955 |
| EXIT PUPIL POSITION | −6.3929 | −8.2832 |
| FRONT PRINCIPAL POINT POSITION | 4.5458 | 4.8548 |
| REAR PRINCIPAL POINT POSITION | 15.2286 | 12.5806 |

(Data 3)
SURFACE DATA

SINGLE LENS DATA

| LENS | FIRST SURFACE | FOCAL LENGTH |
|---|---|---|
| 1 | 1 | −5.8075 |
| 2 | 3 | −3.2835 |
| 3 | 5 | 6.7134 |
| 4 | 7 | 4.8107 |
| 5 | 10 | 3.0525 |
| 6 | 12 | −1.9299 |
| 7 | 14 | 4.3978 |
| 8 | 16 | 14.8293 |
| 9 | 18 | −18.0004 |

ZOOM LENS GROUP DATA

| GROUP | FIRST SURFACE | FOCAL LENGTH | LENS CONFIG. LENGTH | FRONT PRINCIPAL POINT POSITION | REAR PRINCIPAL POINT POSITION |
|---|---|---|---|---|---|
| 1 | 1 | −2.41674 | 4.53660 | 1.54386 | 2.89637 |
| 2 | 7 | 3.55644 | 4.24110 | 1.45993 | 1.97809 |
| 3 | 18 | −18.00045 | 2.62060 | −0.79118 | −0.16340 |

ZOOM LENS GROUP MAGNIFICATION

| GROUP | FIRST SURFACE | WIDE ANGLE | TELEPHOTO |
|---|---|---|---|
| 1 | 1 | 0.00000 | 0.00000 |
| 2 | 7 | −0.63345 | −1.57333 |
| 3 | 18 | 1.16051 | 1.15967 |

Value Implementation Example 4

The zoom lens system according to Value Implementation Example 4 corresponds to Embodiment 4 illustrated in FIG. 7. Various types of data for the zoom lens system according to Value Implementation Example 4 is indicated in Data 4.

(Data 4)
SURFACE DATA

| SURFACE NUMBER | r | d | nd | vd |
|---|---|---|---|---|
| OBJECT SURFACE | ∞ | | | |
| 1 | 16.86450 | 1.24030 | 2.00100 | 29.1 |
| 2 | 5.39730 | 5.18340 | | |
| 3* | −104.42160 | 0.76620 | 1.80470 | 41.0 |
| 4* | 1.81790 | 1.05190 | | |
| 5 | 5.19710 | 1.73310 | 2.10420 | 17.0 |
| 6 | 30.22860 | VARIABLE | | |
| 7* | 3.79340 | 2.23200 | 1.95150 | 29.8 |
| 8* | 67.17270 | 0.10070 | | |
| 9 (DIAPHRAGM) | ∞ | 0.25990 | | |
| 10* | −7.99430 | 0.37550 | 1.77200 | 50.0 |
| 11 | −1.84450 | 0.00500 | 1.56732 | 42.8 |
| 12 | −1.84450 | 0.30000 | 2.00272 | 19.3 |
| 13 | 77.57730 | 0.30660 | | |
| 14 | 15.27490 | 0.52240 | 1.58144 | 40.9 |
| 15 | −3.59930 | VARIABLE | | |
| 16* | 8.03530 | 1.48470 | 1.80998 | 40.9 |
| 17* | −4.48550 | 0.90360 | | |
| 18 | ∞ | 0.70000 | 1.51680 | 64.2 |
| 19 | ∞ | 0.10000 | | |
| 20 | ∞ | BF | | |
| IMAGING SURFACE | ∞ | | | |

(Data 4)
ASPHERIC SURFACE DATA

THIRD SURFACE

K = 6.00000E+02, A4 = −5.37061E−03, A6 = 4.61858E−04, A8 = −2.02896E−05 A10 = 4.05338E−07, A12 = 4.52849E−21
FOURTH SURFACE

K = −7.24800E−01, A4 = −1.92756E−02, A6 = 5.70648E−04, A8 = 2.40775E−05 A10 = −6.23575E−06, A12 = 0.00000E+00
SEVENTH SURFACE

K = −4.28166E+00, A4 = 1.01131E−02, A6 = −3.21492E−03, A8 = 1.67172E−03 A10 = −4.19872E−04, A12 = 0.00000E+00
EIGHTH SURFACE

K = 0.00000E+00, A4 = −1.72318E−02, A6 = −1.61759E−02, A8 = 3.67025E−02 A10 = −2.97330E−02, A12 = 0.00000E+00
TENTH SURFACE

K = 4.87200E+01, A4 = −2.64065E−02, A6 = −5.66206E−03, A8 = 1.67805E−01 A10 = −3.93868E−01, A12 = 0.00000E+00
SIXTEENTH SURFACE

K = −2.64392E−01, A4 = −1.84968E−03, A6 = 6.39550E−04, A8 = −1.09790E−04 A10 = 1.56268E−06, A12 = 0.00000E+00
SEVENTEENTH SURFACE

K = −3.34123E−02, A4 = 1.36615E−02, A6 = −7.07646E−04, A8 = −1.51665E−05 A10 = −6.33150E−10, A12 = 0.00000E+00

VARIOUS DATA
ZOOM RATIO 2.11026

| | WIDE ANGLE | TELEPHOTO |
|---|---|---|
| FOCAL LENGTH | 0.8650 | 1.8254 |
| F NUMBER | 4.00617 | 6.04085 |
| ANGLE OF VIEW | 110.0000 | 52.6990 |
| IMAGE HEIGHT | 1.8872 | 2.2000 |
| LENS LENGTH | 24.0837 | 24.0837 |
| BF | 0.00000 | 0.00000 |
| d6 | 4.8260 | 1.0260 |
| d15 | 1.9924 | 5.7924 |
| ENTRANCE PUPIL POSITION | 5.0040 | 4.8332 |
| EXIT PUPIL POSITION | 39.9255 | 5.3545 |
| FRONT PRINCIPAL POINT POSITION | 5.8877 | 7.2806 |
| REAR PRINCIPAL POINT POSITION | 23.2181 | 22.2556 |

SINGLE LENS DATA

| LENS | FIRST SURFACE | FOCAL LENGTH |
|---|---|---|
| 1 | 1 | −8.3833 |
| 2 | 3 | −2.2133 |
| 3 | 5 | 5.4846 |
| 4 | 7 | 4.1541 |
| 5 | 10 | 3.0254 |
| 6 | 12 | −1.7934 |
| 7 | 14 | 5.0613 |
| 8 | 16 | 3.7531 |

ZOOM LENS GROUP DATA

| GROUP | FIRST SURFACE | FOCAL LENGTH | LENS CONFIG. LENGTH | FRONT PRINCIPAL POINT POSITION | REAR PRINCIPAL POINT POSITION |
|---|---|---|---|---|---|
| 1 | 1 | −2.38521 | 9.97490 | 3.04616 | 5.68367 |
| 2 | 7 | 4.97448 | 4.10210 | 0.70178 | 1.62063 |
| 3 | 16 | 3.75307 | 3.08830 | 0.55592 | 1.41287 |

-continued (Data 4)

ZOOM LENS GROUP MAGNIFICATION

| GROUP | FIRST SURFACE | WIDE ANGLE | TELEPHOTO |
|---|---|---|---|
| 1 | 1 | 0.00000 | 0.00000 |
| 2 | 7 | −0.68806 | −1.45040 |
| 3 | 16 | 0.52708 | 0.52766 |

Value Implementation Example 5

The zoom lens system according to Value Implementation Example 5 corresponds to Embodiment 5 illustrated in FIG. 9. Various types of data for the zoom lens system according to Value Implementation Example 5 is indicated in Data 5.

(Data 5)

SURFACE DATA

| SURFACE NUMBER | r | d | nd | vd |
|---|---|---|---|---|
| OBJECT SURFACE | ∞ | | | |
| 1 | 9.84940 | 1.00000 | 1.80420 | 46.5 |
| 2 | 3.62380 | 2.64570 | | |
| 3* | −16.47510 | 0.70000 | 1.80470 | 41.0 |
| 4* | 3.33100 | 0.14940 | | |
| 5 | 3.71630 | 0.96250 | 1.92286 | 20.9 |
| 6 | 8.95550 | VARIABLE | | |
| 7 | 4.62710 | 0.68800 | 2.00069 | 25.5 |
| 8 | −64.73000 | 0.26770 | | |
| 9 (DIAPHRAGM) | ∞ | 0.26770 | | |
| 10* | 10.82360 | 1.54760 | 1.68400 | 31.3 |
| 11 | −2.10890 | 0.00500 | 1.56732 | 42.8 |
| 12 | −2.10890 | 0.30000 | 2.00272 | 19.3 |
| 13 | 5.79530 | 0.34390 | | |
| 14 | 11.95000 | 1.73170 | 1.62041 | 60.3 |
| 15 | −3.60450 | 0.28450 | | |
| 16 | 5.63440 | 1.00000 | 1.84666 | 23.8 |
| 17 | 11.94950 | VARIABLE | | |
| 18* | 39.57050 | 0.80000 | 1.52996 | 55.8 |
| 19* | 9.72580 | 0.85240 | | |
| 20 | ∞ | 0.70000 | 1.51680 | 64.2 |
| 21 | ∞ | 0.10000 | | |
| 22 | ∞ | BF | | |
| IMAGING SURFACE | ∞ | | | |

ASPHERIC SURFACE DATA

THIRD SURFACE

K = 0.00000E+00, A4 = −3.27472E−03, A6 = 4.49639E−04, A8 = −1.56421E−05 A10 = 3.34798E−08
FOURTH SURFACE

K = 0.00000E+00, A4 = −3.59758E−03, A6 = 3.19579E−04, A8 = 1.88341E−06 A10 = 4.17795E−06
TENTH SURFACE

K = 0.00000E+00, A4 = −8.54935E−04, A6 = 4.91496E−04, A8 = −2.83361E−05 A10 = −8.00107E−05
EIGHTEENTH SURFACE

K = 0.00000E+00, A4 = −2.53677E−02, A6 = 1.24470E−03, A8 = 1.55834E−04 A10 = −9.14708E−06
NINETEENTH SURFACE

K = 0.00000E+00, A4 = −2.80105E−02, A6 = 1.84426E−03, A8 = 8.35264E−05 A10 = 5.03781E−07

-continued (Data 5)

VARIOUS DATA
ZOOM RATIO 1.90653

| | WIDE ANGLE | TELEPHOTO |
|---|---|---|
| FOCAL LENGTH | 2.3504 | 4.4811 |
| F NUMBER | 3.00150 | 3.78383 |
| ANGLE OF VIEW | 72.0000 | 36.0100 |
| IMAGE HEIGHT | 3.0000 | 3.0000 |
| LENS LENGTH | 19.6191 | 19.6191 |
| BF | 0.00000 | 0.00000 |
| d6 | 3.2530 | 0.3000 |
| d17 | 2.0200 | 4.9730 |
| ENTRANCE PUPIL POSITION | 4.1457 | 3.5819 |
| EXIT PUPIL POSITION | −8.3922 | −9.7595 |
| FRONT PRINCIPAL POINT POSITION | 5.8386 | 6.0050 |
| REAR PRINCIPAL POINT POSITION | 17.2788 | 15.1357 |

SINGLE LENS DATA

| LENS | FIRST SURFACE | FOCAL LENGTH |
|---|---|---|
| 1 | 1 | −7.6788 |
| 2 | 3 | −3.3898 |
| 3 | 5 | 6.3256 |
| 4 | 7 | 4.3369 |
| 5 | 10 | 2.7122 |
| 6 | 12 | −1.5133 |
| 7 | 14 | 4.6623 |
| 8 | 16 | 11.7400 |
| 9 | 18 | −24.5605 |

ZOOM LENS GROUP DATA

| GROUP | FIRST SUR- FACE | FOCAL LENGTH | LENS CONFIG. LENGTH | FRONT PRINCIPAL POINT POSITION | REAR PRINCIPAL POINT POSITION |
|---|---|---|---|---|---|
| 1 | 1 | −3.09459 | 5.45760 | 2.15046 | 3.80042 |
| 2 | 7 | 4.48578 | 6.43610 | 2.68818 | 2.61965 |
| 3 | 18 | −24.56054 | 2.35240 | 0.69979 | 1.21050 |

ZOOM LENS GROUP MAGNIFICATION

| GROUP | FIRST SURFACE | WIDE ANGLE | TELEPHOTO |
|---|---|---|---|
| 1 | 1 | 0.00000 | 0.00000 |
| 2 | 7 | −0.72268 | −1.37847 |
| 3 | 18 | 1.05098 | 1.05047 |

Value Implementation Example 6

The zoom lens system according to Value Implementation Example 6 corresponds to Embodiment 6 illustrated in FIG. 11. Various types of data for the zoom lens system according to Value Implementation Example 6 is indicated in Data 6.

(Data 6)
SURFACE DATA

| SURFACE NUMBER | r | d | nd | vd |
|---|---|---|---|---|
| OBJECT SURFACE | ∞ | | | |
| 1 | 20.00000 | 0.70000 | 1.80420 | 46.5 |
| 2 | 8.77570 | 0.10000 | | |
| 3* | 7.76790 | 1.00000 | 1.80998 | 40.9 |
| 4* | 4.60710 | 0.75370 | | |
| 5 | 2.88030 | 1.07000 | 2.10420 | 17.0 |
| 6 | 2.96510 | VARIABLE | | |
| 7 | −3.35580 | 1.02520 | 1.92286 | 20.9 |
| 8 | −2.84150 | 0.14070 | | |

(Data 6)
SURFACE DATA

| | | | | |
|---|---|---|---|---|
| 9 (DIAPHRAGM) | ∞ | 0.36690 | | |
| 10 | 1.90680 | 0.85690 | 1.68893 | 31.1 |
| 11 | −1.28440 | 0.00500 | 1.56732 | 42.8 |
| 12 | −1.28440 | 0.34430 | 2.00272 | 19.3 |
| 13 | 3.37150 | 0.53170 | | |
| 14* | 14.38460 | 1.80220 | 2.00100 | 29.1 |
| 15* | −2.39950 | 0.10050 | | |
| 16* | 21.92630 | 0.70000 | 2.00272 | 19.3 |
| 17* | 624.27740 | 0.91610 | | |
| 18 | ∞ | 0.70000 | 1.51680 | 64.2 |
| 19 | ∞ | 0.10000 | | |
| 20 | ∞ | BF | | |
| IMAGING SURFACE | ∞ | | | |

ASPHERIC SURFACE DATA

THIRD SURFACE

K = 0.00000E+00, A4 = 6.76079E−03, A6 = −3.73238E−04,
A8 = −1.61278E−05 A10 = −3.86062E−06, A12 = 2.95204E−07,
A14 = 0.00000E+00
FOURTH SURFACE

K = 1.25412E+00, A4 = 9.14039E−03, A6 = 3.64079E−04,
A8 = −3.39362E−04 A10 = −2.13213E−07, A12 = 2.02615E−06,
A14 = 0.00000E+00
FOURTEENTH SURFACE

K = −1.27119E+01, A4 = 1.15476E−04, A6 = −1.03669E−03,
A8 = −2.21666E−04 A10 = 1.95387E−05, A12 = 1.12181E−05,
A14 = −3.21579E−06
FIFTEENTH SURFACE

K = −1.21834E−01, A4 = 3.37989E−03, A6 = 8.11476E−04,
A8 = 7.24892E−05 A10 = 3.92881E−06, A12 = 1.17555E−07,
A14 = −8.13431E−07
SIXTEENTH SURFACE

K = −4.61155E+01, A4 = 7.25744E−03, A6 = −1.39294E−03,
A8 = 4.99065E−04 A10 = −4.53181E−05, A12 = 0.00000E+00,
A14 = 0.00000E+00
SEVENTEENTH SURFACE

K = 2.48354E+04, A4 = 2.99111E−02, A6 = −2.66720E−03,
A8 = 1.27313E−03 A10 = −1.41195E−04, A12 = 0.00000E+00,
A14 = 0.00000E+00

(Data 6)
SURFACE DATA

VARIOUS DATA
ZOOM RATIO 1.07066

| | WIDE ANGLE | TELEPHOTO |
|---|---|---|
| FOCAL LENGTH | 2.3438 | 2.5094 |
| F NUMBER | 5.60771 | 5.60501 |
| ANGLE OF VIEW | 60.0000 | 40.0000 |
| IMAGE HEIGHT | 2.4002 | 2.4001 |
| LENS LENGTH | 13.0733 | 11.7132 |
| BF | 0.00000 | 0.00000 |
| d6 | 1.8601 | 0.5000 |
| ENTRANCE PUPIL POSITION | 5.0030 | 3.6123 |
| EXIT PUPIL POSITION | 40.9169 | 40.9169 |
| FRONT PRINCIPAL POINT POSITION | 7.4811 | 6.2756 |
| REAR PRINCIPAL POINT POSITION | 10.7195 | 9.2138 |

SINGLE LENS DATA

| LENS | FIRST SURFACE | FOCAL LENGTH |
|---|---|---|
| 1 | 1 | −20.0001 |
| 2 | 3 | −16.2840 |
| 3 | 5 | 11.9674 |
| 4 | 7 | 10.2675 |
| 5 | 10 | 1.2510 |
| 6 | 12 | −0.8944 |
| 7 | 14 | 2.1710 |
| 8 | 16 | 22.6496 |

ZOOM LENS GROUP DATA

| GROUP | FIRST SURFACE | FOCAL LENGTH | LENS CONFIG. LENGTH | FRONT PRINCIPAL POINT POSITION | REAR PRINCIPAL POINT POSITION |
|---|---|---|---|---|---|
| 1 | 1 | −19.99686 | 3.62370 | 4.54374 | 5.58703 |
| 2 | 7 | 2.41553 | 7.48950 | 3.13041 | 4.88092 |

ZOOM LENS GROUP MAGNIFICATION

| GROUP | FIRST SURFACE | WIDE ANGLE | TELEPHOTO |
|---|---|---|---|
| 1 | 1 | 0.00000 | 0.00000 |
| 2 | 7 | −0.11721 | −0.12549 |

Values Corresponding to Condition

Values corresponding to the various value implementation examples are given in the following table.

TABLE 1

| | | | VALUE IMPLEMENTAION EXAMPLES | | | | | |
|---|---|---|---|---|---|---|---|---|
| | | | 1 | 2 | 3 | 4 | 5 | 6 |
| | | fG2 | 4.26 | 5.11 | 3.56 | 4.97 | 4.49 | 2.42 |
| | | fCL | −6.66 | −29.07 | −6.57 | −4.20 | −4.10 | −13.90 |
| | | Np | 31.1 | 61.3 | 31.1 | 50.0 | 31.3 | 31.1 |
| | | Nn | 19.3 | 18.0 | 19.3 | 19.3 | 19.3 | 19.3 |
| | | fG1 | −2.71 | −2.59 | −2.42 | −2.39 | −3.09 | −20.0 |
| | | fW | 1.66 | 0.99 | 1.78 | 0.87 | 2.35 | 2.3 |
| | | wW | 101 | 101 | 101 | 110 | 72 | 60 |
| CON- DI- TIONS | (1) | fG2/fCL | −0.64 | −0.18 | −0.54 | −1.18 | −1.09 | −0.17 |
| | (2) | vp/vn | 1.61 | 3.41 | 1.61 | 2.59 | 1.62 | 1.61 |
| | (3) | 1/(fG1/(2 × fW × tan(wW/2))) | −1.49 | −0.93 | −1.78 | −1.04 | −1.10 | −0.14 |

INDUSTRIAL APPLICABILITY

The zoom lens system according to the present disclosure is applicable to, for example, digital cameras, digital video cameras, cameras in cellular phones, cameras in personal digital assistance (PDA) devices, in-car cameras, sensor cameras for visualizing the environment between another vehicle, security cameras, and web cameras. In particular, the zoom lens system according to the present disclosure is suitable for use in cameras requiring a wide angle lens, such as in-car cameras and security cameras.

What is claimed is:

1. A zoom lens system, comprising, in order from an object side to an image side:
    a first lens group having negative power;
    a second lens group having positive power; and
    a third lens group having positive power,
    wherein the first lens group includes at least two negative lenses, and
    when zooming, the first lens group and the third lens group are fixed relative to an imaging surface, the second lens group moves along an optical axis to change an angle of view, and a total angle of view at a wide angle extremity is at least 120 degrees.

2. The zoom lens system according to claim 1, wherein a lens closest to an object in the first lens group has negative power and has a refractive index of at least 1.8.

3. A zoom lens system, comprising, in order from an object side to an image side:
    a first lens group having negative power;
    a second lens group having positive power; and
    a third lens group having negative power,
    wherein when zooming, the first lens group and the third lens group are fixed relative to an imaging surface, the second lens group moves along an optical axis to change an angle of view, and a total angle of view at a wide angle extremity is at least 120 degrees.

4. The zoom lens system according to claim 3, wherein a lens closest to an object in the first lens group has negative power and has a refractive index of at least 1.8.

5. A zoom lens system, comprising, in order from an object side to an image side:
    a first lens group having negative power, and
    a second lens group having positive power,
    wherein the first lens group includes at least two negative lenses,
    when zooming, the first lens group is fixed relative to an imaging surface, the second lens group moves along an optical axis to change an angle of view, and a total angle of view at a wide angle extremity is at least 120 degrees, and
    a lens closest to an image in the first lens group has positive power and has a refractive index of at least 1.9.

6. The zoom lens system according to claim 5, wherein a lens closest to an object in the first lens group has negative power and has a refractive index of at least 1.8.

7. A zoom lens system, comprising, in order from an object side to an image side:
    a first lens group having negative power, and
    a second lens group having positive power,
    wherein the first lens group includes at least two negative lenses,
    the second lens group includes a cemented lens having negative power,
    when zooming, the first lens group is fixed relative to an imaging surface, the second lens group moves along an optical axis to change an angle of view, and a total angle of view at a wide angle extremity is at least 120 degrees, and
    the following condition (1) is satisfied:

$$-1.50 < fG2/fCL < 0.05 \qquad (1)$$

where:
    fG2 is a focal length along a d-line of the second lens group; and
    fCL is a focal length along a d-line of the cemented lens.

8. The zoom lens system according to claim 7, wherein the cemented lens includes:
    a lens having positive power; and
    a lens having negative power, and
    the following condition (2) is satisfied:

$$1.0 < vp/vn < 4.0 \qquad (2)$$

where:
    vp is an Abbe number of the lens having positive power; and
    vn is an Abbe number of the lens having negative power.

9. The zoom lens system according to claim 7, wherein a lens closest to an object in the first lens group has negative power and has a refractive index of at least 1.8.

10. A zoom lens system, comprising, in order from an object side to an image side:
    a first lens group having negative power; and
    a second lens group having positive power,
    wherein the first lens group includes at least two negative lenses,
    when zooming, the first lens group is fixed relative to an imaging surface, the second lens group moves along an optical axis to change an angle of view, and a total angle of view at a wide angle extremity is at least 120 degrees, and
    the following condition (3) is satisfied:

$$-2.0 < 1/(fG1/(2 \times fW \times \tan(wW/2))) < -0.5 \qquad (3)$$

where:
    fG1 is a focal length along a d-line of the first lens group;
    fW is a focal length along a d-line of a wide angle extremity; and
    wW is a half angle of view at the wide angle extremity.

11. The zoom lens system according to claim 10, wherein a lens closest to an object in the first lens group has negative power and has a refractive index of at least 1.8.

12. An imaging device capable of outputting an optical image of an object as an electric image signal, the imaging device comprising:
    a zoom lens system that forms the optical image of the object; and
    an imaging element that converts the optical image formed by the zoom lens system into the electric image signal,
    wherein the zoom lens system includes, in order from an object side to an image side:
    a first lens group having negative power;
    a second lens group having positive power; and
    a third lens group having positive power, the first lens group includes at least two negative lenses, and when zooming, the first lens group and the third lens group are fixed relative to an imaging surface, the second lens group moves along an optical axis to switch an angle of view, and a total angle of view at a wide angle extremity is at least 120 degrees.

13. A vehicle that converts an optical image of an object into an electric image signal and at least one of displays and stores the converted image signal, the vehicle comprising:
   a zoom lens system that forms the optical image of the object;
   an imaging element that converts the optical image formed by the zoom lens system into the electric image signal; and
   a controller that controls a zoom position of the zoom lens system,
   wherein the zoom lens system includes, in order from an object side to an image side:
      a first lens group having negative power;
      a second lens group having positive power; and
      a third lens group having positive power,
   the first lens group includes at least two negative lenses, and
   when zooming, the first lens group and the third lens group are fixed relative to an imaging surface, the second lens group moves along an optical axis to switch an angle of view, and a total angle of view at a wide angle extremity is at least 120 degrees.

14. An imaging device capable of outputting an optical image of an object as an electric image signal, the imaging device comprising:
   a zoom lens system that forms the optical image of the object; and
   an imaging element that converts the optical image formed by the zoom lens system into the electric image signal,
   wherein the zoom lens system includes, in order from an object side to an image side:
      a first lens group having negative power;
      a second lens group having positive power; and
      a third lens group having negative power,
   the first lens group includes at least two negative lenses, and
   when zooming, the first lens group and the third lens group are fixed relative to an imaging surface, the second lens group moves along an optical axis to switch an angle of view, and a total angle of view at a wide angle extremity is at least 120 degrees.

15. A vehicle that converts an optical image of an object into an electric image signal and at least one of displays and stores the converted image signal, the vehicle comprising:
   a zoom lens system that forms the optical image of the object;
   an imaging element that converts the optical image formed by the zoom lens system into the electric image signal; and
   a controller that controls a zoom position of the zoom lens system,
   wherein the zoom lens system includes, in order from an object side to an image side:
      a first lens group having negative power;
      a second lens group having positive power; and
      a third lens group having negative power,
   the first lens group includes at least two negative lenses, and
   when zooming, the first lens group and the third lens group are fixed relative to an imaging surface, the second lens group moves along an optical axis to switch an angle of view, and a total angle of view at a wide angle extremity is at least 120 degrees.

* * * * *